US012572582B1

(12) United States Patent
Floyd et al.

(10) Patent No.: US 12,572,582 B1
(45) Date of Patent: Mar. 10, 2026

(54) STRUCTURED DATA EXTRACTION USING GENERATIVE MACHINE LEARNING MODELS

(71) Applicant: State Farm Mutual Automobile Insurance Company, Bloomington, IL (US)

(72) Inventors: Matt Floyd, Johns Creek, GA (US); Alvin Yu, Peachtree Corners, GA (US); David Hundley, Bloomington, IL (US); Bryan Caraway, Washington DC, DC (US); Youngwook Kim, Sandy Springs, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/793,656

(22) Filed: Aug. 2, 2024

(51) Int. Cl.
G06F 16/00 (2019.01)
G06F 16/383 (2019.01)
G06N 3/0475 (2023.01)

(52) U.S. Cl.
CPC ......... G06F 16/383 (2019.01); G06N 3/0475 (2023.01)

(58) Field of Classification Search
CPC ............................. G06F 16/383; G06N 3/0475
See application file for complete search history.

(56) References Cited

U.S. PATENT DOCUMENTS

| | | | |
|---|---|---|---|
| 10,963,273 | B2 | 3/2021 | Peng |
| 10,972,297 | B2 | 4/2021 | Jacobson |
| 11,423,234 | B2 | 8/2022 | De Ridder |
| 11,630,958 | B2 | 4/2023 | Ronen |
| 11,861,320 | B1 * | 1/2024 | Gajek ..................... G06F 40/35 |
| 2024/0273309 | A1 * | 8/2024 | Heller ..................... G06F 40/56 |
| 2024/0338554 | A1 * | 10/2024 | Schmidt ................. G06N 3/045 |
| 2025/0005299 | A1 * | 1/2025 | Padmanabhan ....... G06F 16/335 |
| 2025/0013893 | A1 * | 1/2025 | Raymond .......... G06Q 50/2057 |
| 2025/0028743 | A1 * | 1/2025 | Massoudian ........... G16H 10/60 |
| 2025/0086398 | A1 * | 3/2025 | Yang ..................... G06N 20/00 |
| 2025/0274466 | A1 * | 8/2025 | Narayan ................ G06F 40/40 |

* cited by examiner

*Primary Examiner* — Syed H Hasan
(74) *Attorney, Agent, or Firm* — Lee & Hayes, P.C.

(57) ABSTRACT

This disclosure describes techniques for automated data extraction, validation, and routing based on unstructured text data. In some cases, the techniques described herein include receiving text data, segmenting the text data into multiple segments, assigning each segment to a category, generating a prompt for each segment based on the segment's category, extracting field values from each segment using the generated prompt, validating or rejecting the extracted field values based on category-specific validation rules, and routing the validated field values to category-specific target databases and/or reviewer platforms based on the validation results.

20 Claims, 9 Drawing Sheets

300

RECEIVE MODEL OUTPUT
302

IDENTIFY A FIELD
304

RETRIEVE FIELD NAME
306

RETRIEVE FIELD FORMAT
308

NAME VALID?
310

YES          NO

FORMAT VALID?
312

NO

PROVIDE VALUE FOR REVIEW
314

YES

STORE THE VALUE
316

Figure 4:
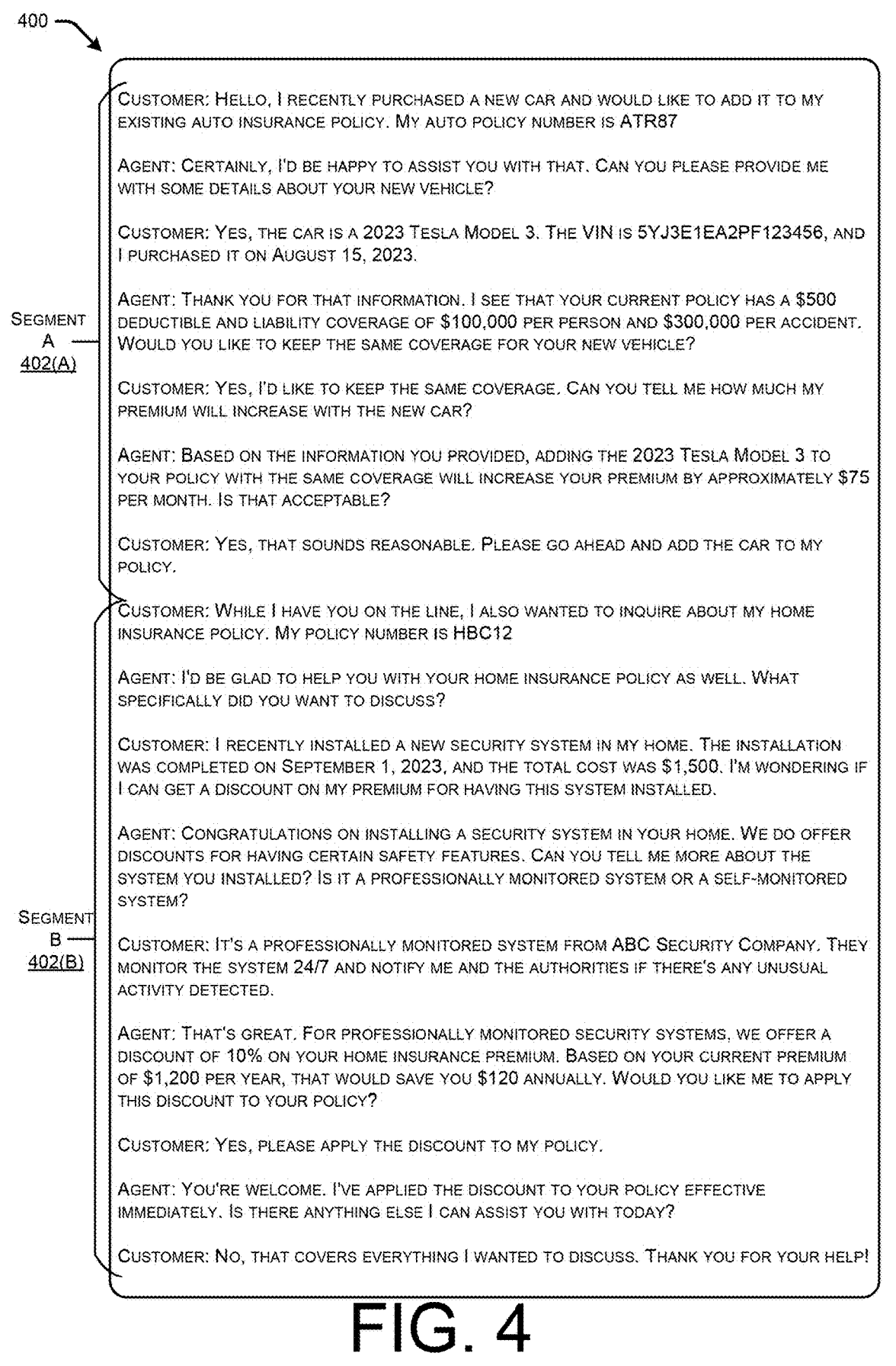

400

SEGMENT A 402(A)

CUSTOMER: HELLO, I RECENTLY PURCHASED A NEW CAR AND WOULD LIKE TO ADD IT TO MY EXISTING AUTO INSURANCE POLICY. MY AUTO POLICY NUMBER IS ATR87

AGENT: CERTAINLY, I'D BE HAPPY TO ASSIST YOU WITH THAT. CAN YOU PLEASE PROVIDE ME WITH SOME DETAILS ABOUT YOUR NEW VEHICLE?

CUSTOMER: YES, THE CAR IS A 2023 TESLA MODEL 3. THE VIN IS 5YJ3E1EA2PF123456, AND I PURCHASED IT ON AUGUST 15, 2023.

AGENT: THANK YOU FOR THAT INFORMATION. I SEE THAT YOUR CURRENT POLICY HAS A $500 DEDUCTIBLE AND LIABILITY COVERAGE OF $100,000 PER PERSON AND $300,000 PER ACCIDENT. WOULD YOU LIKE TO KEEP THE SAME COVERAGE FOR YOUR NEW VEHICLE?

CUSTOMER: YES, I'D LIKE TO KEEP THE SAME COVERAGE. CAN YOU TELL ME HOW MUCH MY PREMIUM WILL INCREASE WITH THE NEW CAR?

AGENT: BASED ON THE INFORMATION YOU PROVIDED, ADDING THE 2023 TESLA MODEL 3 TO YOUR POLICY WITH THE SAME COVERAGE WILL INCREASE YOUR PREMIUM BY APPROXIMATELY $75 PER MONTH. IS THAT ACCEPTABLE?

CUSTOMER: YES, THAT SOUNDS REASONABLE. PLEASE GO AHEAD AND ADD THE CAR TO MY POLICY.

SEGMENT B 402(B)

CUSTOMER: WHILE I HAVE YOU ON THE LINE, I ALSO WANTED TO INQUIRE ABOUT MY HOME INSURANCE POLICY. MY POLICY NUMBER IS HBC12

AGENT: I'D BE GLAD TO HELP YOU WITH YOUR HOME INSURANCE POLICY AS WELL. WHAT SPECIFICALLY DID YOU WANT TO DISCUSS?

CUSTOMER: I RECENTLY INSTALLED A NEW SECURITY SYSTEM IN MY HOME. THE INSTALLATION WAS COMPLETED ON SEPTEMBER 1, 2023, AND THE TOTAL COST WAS $1,500. I'M WONDERING IF I CAN GET A DISCOUNT ON MY PREMIUM FOR HAVING THIS SYSTEM INSTALLED.

AGENT: CONGRATULATIONS ON INSTALLING A SECURITY SYSTEM IN YOUR HOME. WE DO OFFER DISCOUNTS FOR HAVING CERTAIN SAFETY FEATURES. CAN YOU TELL ME MORE ABOUT THE SYSTEM YOU INSTALLED? IS IT A PROFESSIONALLY MONITORED SYSTEM OR A SELF-MONITORED SYSTEM?

CUSTOMER: IT'S A PROFESSIONALLY MONITORED SYSTEM FROM ABC SECURITY COMPANY. THEY MONITOR THE SYSTEM 24/7 AND NOTIFY ME AND THE AUTHORITIES IF THERE'S ANY UNUSUAL ACTIVITY DETECTED.

AGENT: THAT'S GREAT. FOR PROFESSIONALLY MONITORED SECURITY SYSTEMS, WE OFFER A DISCOUNT OF 10% ON YOUR HOME INSURANCE PREMIUM. BASED ON YOUR CURRENT PREMIUM OF $1,200 PER YEAR, THAT WOULD SAVE YOU $120 ANNUALLY. WOULD YOU LIKE ME TO APPLY THIS DISCOUNT TO YOUR POLICY?

CUSTOMER: YES, PLEASE APPLY THE DISCOUNT TO MY POLICY.

AGENT: YOU'RE WELCOME. I'VE APPLIED THE DISCOUNT TO YOUR POLICY EFFECTIVE IMMEDIATELY. IS THERE ANYTHING ELSE I CAN ASSIST YOU WITH TODAY?

CUSTOMER: NO, THAT COVERS EVERYTHING I WANTED TO DISCUSS. THANK YOU FOR YOUR HELP!

Figure 5:
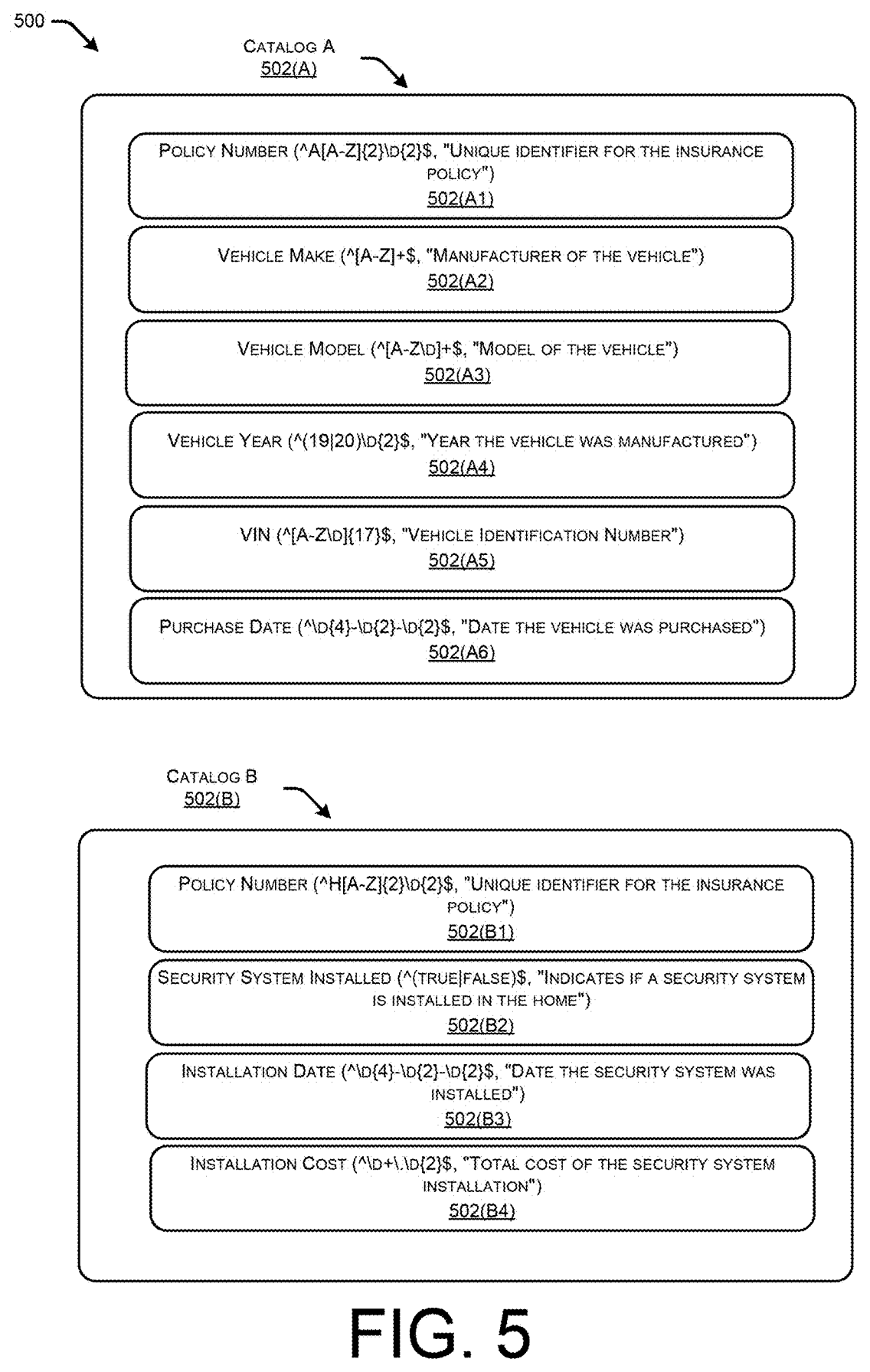

CATALOG A
502(A)

POLICY NUMBER (^A[A-Z]{2}\D{2}$, "UNIQUE IDENTIFIER FOR THE INSURANCE POLICY")
502(A1)

VEHICLE MAKE (^[A-Z]+$, "MANUFACTURER OF THE VEHICLE")
502(A2)

VEHICLE MODEL (^[A-Z\D]+$, "MODEL OF THE VEHICLE")
502(A3)

VEHICLE YEAR (^(19|20)\D{2}$, "YEAR THE VEHICLE WAS MANUFACTURED")
502(A4)

VIN (^[A-Z\D]{17}$, "VEHICLE IDENTIFICATION NUMBER")
502(A5)

PURCHASE DATE (^\D{4}-\D{2}-\D{2}$, "DATE THE VEHICLE WAS PURCHASED")
502(A6)

CATALOG B
502(B)

POLICY NUMBER (^H[A-Z]{2}\D{2}$, "UNIQUE IDENTIFIER FOR THE INSURANCE POLICY")
502(B1)

SECURITY SYSTEM INSTALLED (^(TRUE|FALSE)$, "INDICATES IF A SECURITY SYSTEM IS INSTALLED IN THE HOME")
502(B2)

INSTALLATION DATE (^\D{4}-\D{2}-\D{2}$, "DATE THE SECURITY SYSTEM WAS INSTALLED")
502(B3)

INSTALLATION COST (^\D+\.\D{2}$, "TOTAL COST OF THE SECURITY SYSTEM INSTALLATION")
502(B4)

PROMPT A
602(A)

EXTRACT THE #FIELDS SPECIFIED BELOW FROM THE #TEXT. THE FIELDS ARE SPECIFIED THE [FIELD_NAME:FIELD_DESCRIPTION] FORMAT. IN YOUR OUTPUT, MARK EACH FIELD WITH ITS APPROPRIATE NAME.
FIELDS:
VEHICLE MAKE: MANUFACTURER OF THE VEHICLE
VEHICLE MODEL: MODEL OF THE VEHICLE
VEHICLE YEAR: YEAR THE VEHICLE WAS MANUFACTURED
VIN: VEHICLE IDENTIFICATION NUMBER
PURCHASE DATE: DATE THE VEHICLE WAS PURCHASED

TEXT:

SEGMENT A
402(A)

PROMPT B
602(B)

EXTRACT THE #FIELDS SPECIFIED BELOW FROM THE #TEXT. THE FIELDS ARE SPECIFIED THE [FIELD_NAME:FIELD_DESCRIPTION] FORMAT. IN YOUR OUTPUT, MARK EACH FIELD WITH ITS APPROPRIATE NAME.
FIELDS:
SECURITY SYSTEM INSTALLED: INDICATES IF A SECURITY SYSTEM IS INSTALLED IN THE HOME
INSTALLATION DATE: DATE THE SECURITY SYSTEM WAS INSTALLED
INSTALLATION COST: TOTAL COST OF THE SECURITY SYSTEM INSTALLATION

TEXT:

SEGMENT B
402(B)

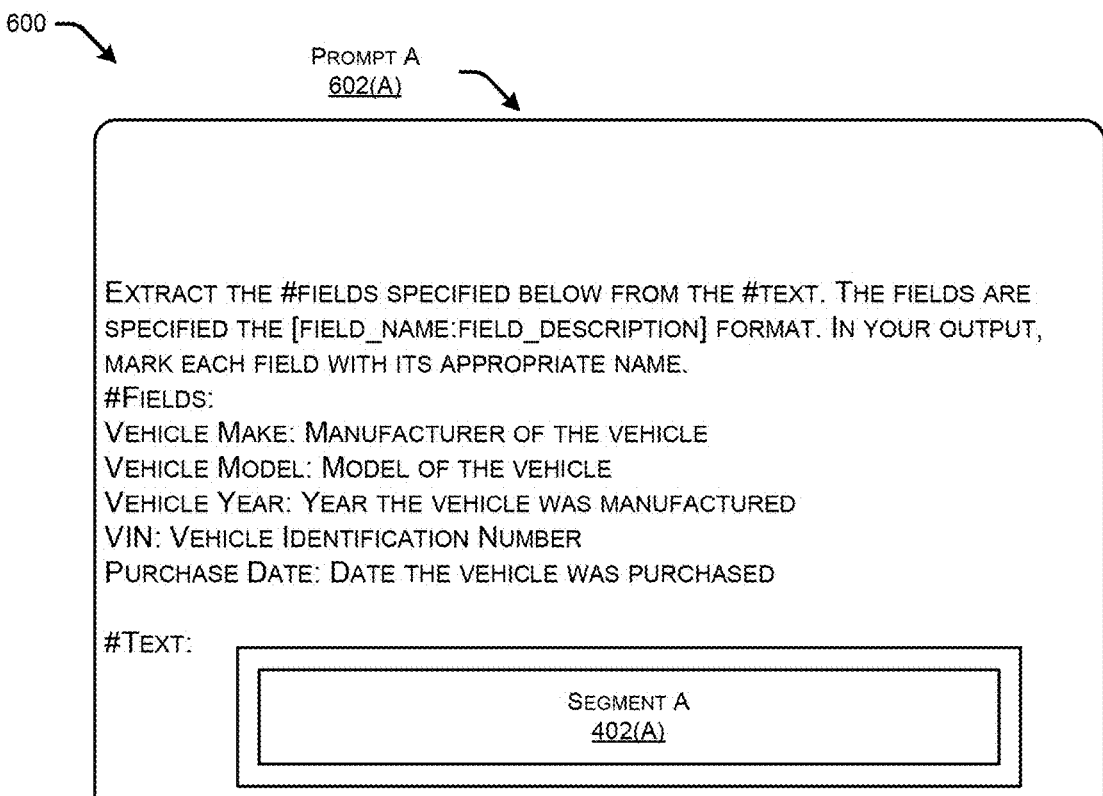

FIG. 6

700
OUTPUT A
702(A)
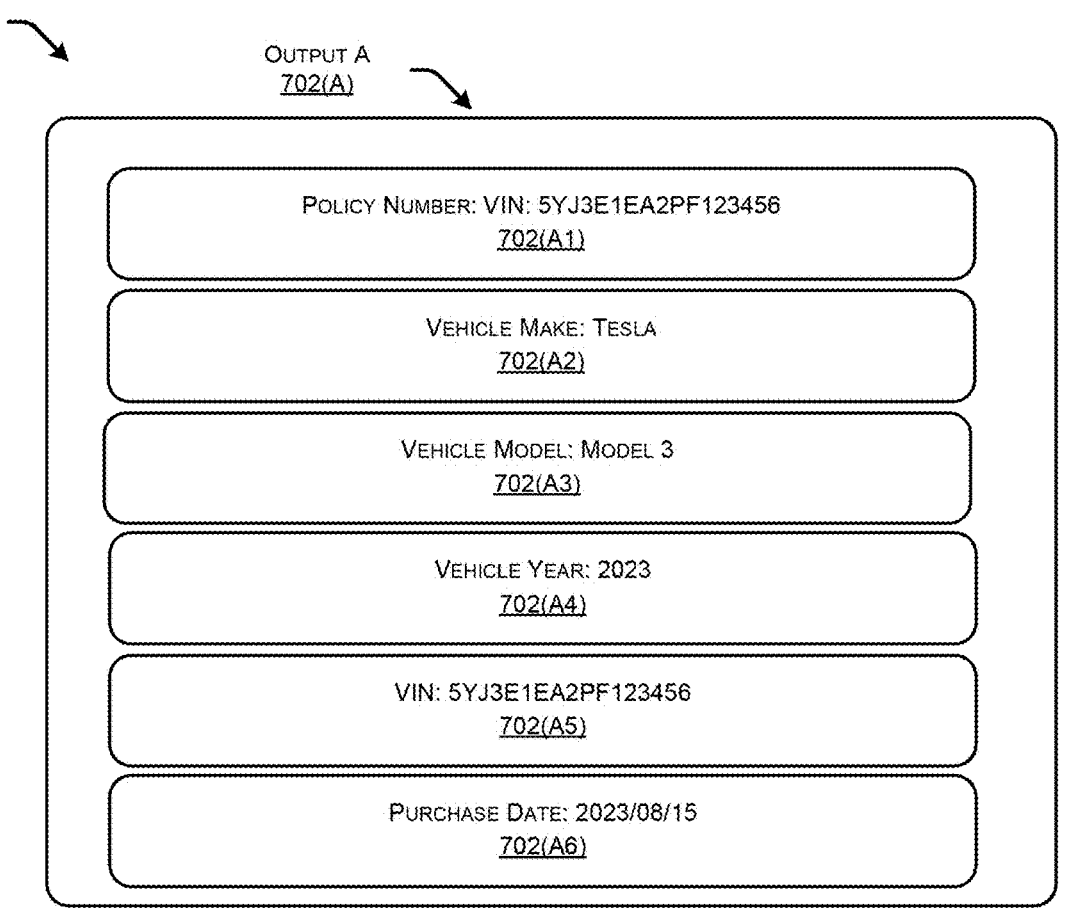
POLICY NUMBER: VIN: 5YJ3E1EA2PF123456
702(A1)
VEHICLE MAKE: TESLA
702(A2)
VEHICLE MODEL: MODEL 3
702(A3)
VEHICLE YEAR: 2023
702(A4)
VIN: 5YJ3E1EA2PF123456
702(A5)
PURCHASE DATE: 2023/08/15
702(A6)
OUTPUT B
702(B)
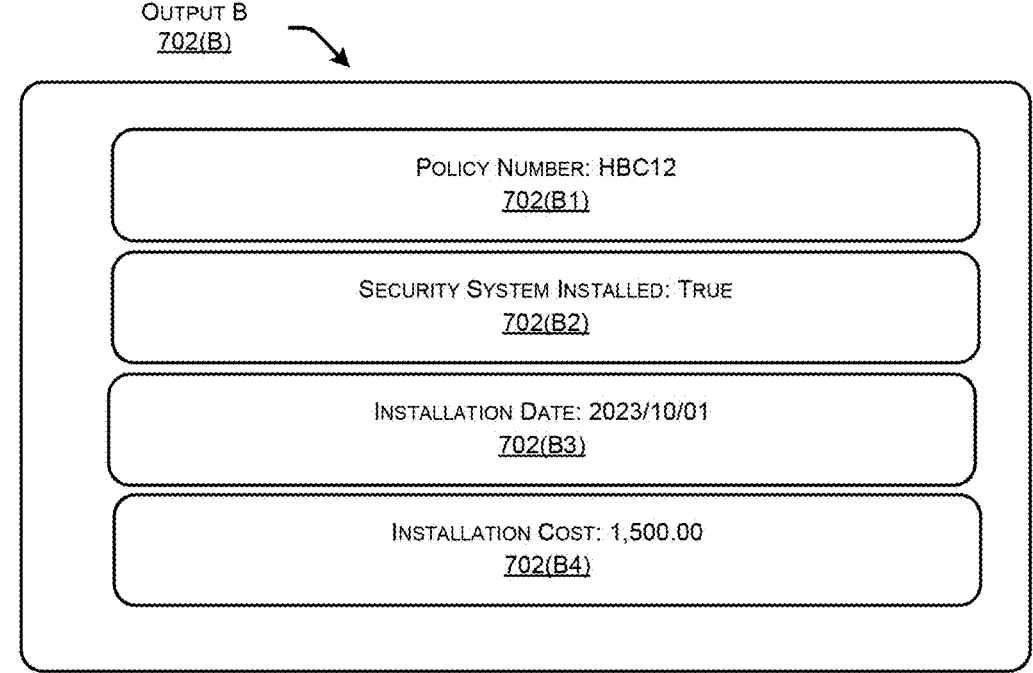
POLICY NUMBER: HBC12
702(B1)
SECURITY SYSTEM INSTALLED: TRUE
702(B2)
INSTALLATION DATE: 2023/10/01
702(B3)
INSTALLATION COST: 1,500.00
702(B4)
FIG. 7

STRUCTURED DATA EXTRACTION USING GENERATIVE MACHINE LEARNING MODELS

TECHNICAL FIELD

The present disclosure relates to natural language processing, and more particularly to techniques for data extraction using machine learning models.

BACKGROUND

Unstructured text data may contain valuable information that can be used to gain insights and make informed decisions. However, extracting structured data from unstructured text remains a challenging task due to the variability and/or complexity of natural language. Additionally, extracting structured data from unstructured text also may also require dealing with data quality issues, as the extracted information may be incomplete, inconsistent, and/or ambiguous. Furthermore, the volume of unstructured text data may pose significant computational challenges for structured data extraction.

Examples of the techniques described in the present disclosure are directed to overcoming the deficiencies noted above.

SUMMARY

In some examples, the techniques described herein relate to a computer-implemented method, including receiving, by a processor, an electronic file including text indicative of a customer interaction. The method may further include determining, by the processor, a first category associated with a first portion of the text and a second category associated with a second portion of the text. The method may further include selecting, by the processor, a first database corresponding to the first category, the first database identifying a first field name of a first data field, a first data format corresponding to the first data field, and a first description of the first data field. The method may further include providing, by the processor, the first portion of the text and the first description as inputs to a trained machine learning model, the machine learning model determining a first value corresponding to the first data field. The method may further include determining, by the processor, that the first value satisfies a first constraint associated with at least one of the first field name or the first data format. The method may further include based on determining that the first value satisfies the constraint, generating, by the processor, first metadata for the electronic file, the first metadata representing the first data value. The method may further include storing, by the processor, the first metadata in the first database and in association with the electronic file.

In additional examples, the techniques described herein relate to a computing system, including a processor and memory storing computer-executable instructions that, when executed by the processor, cause the computing system to perform operations including receiving an electronic file including text indicative of a customer interaction. The operations may further include determining a first category associated with a first portion of the text and a second category associated with a second portion of the text. The operations may further include selecting a first database corresponding to the first category, the first database identifying a first field name of a first data field, a first data format corresponding to the first data field, and a first description of the first data field. The operations may further include providing the first portion of the text and the first description as inputs to a trained machine learning model, the machine learning model determining a first value corresponding to the first data field. The operations may further include determining that the first value satisfies a first constraint associated with at least one of the first field name or the first data format. The operations may further include based on determining that the first value satisfies the constraint, generating first metadata for the electronic file, the first metadata representing the first data value. The operations may further include storing the first metadata in the first database and in association with the electronic file.

In further examples, the techniques described herein relate to one or more non-transitory computer-readable media storing computer-executable instructions that, when executed by the processor, cause the one or more processors to perform operations, including receiving an electronic file including text indicative of a customer interaction. The operations may further include determining a first category associated with a first portion of the text and a second category associated with a second portion of the text. The operations may further include selecting a first database corresponding to the first category, the first database identifying a first field name of a first data field, a first data format corresponding to the first data field, and a first description of the first data field. The operations may further include providing the first portion of the text and the first description as inputs to a trained machine learning model, the machine learning model determining a first value corresponding to the first data field. The operations may further include determining that the first value satisfies a first constraint associated with at least one of the first field name or the first data format. The operations may further include based on determining that the first value satisfies the constraint, generating first metadata for the electronic file, the first metadata representing the first data value. The operations may further include storing the first metadata in the first database and in association with the electronic file.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 provides an operational example of segmenting text data.

FIG. 5 provides an operational example of two database catalogs.

FIG. 6 provides an operational example of two generative model prompts.

FIG. 7 provides an operational example of two generative model outputs.

DETAILED DESCRIPTION

This disclosure describes techniques for automated data extraction, validation, and routing based on unstructured text data. In some cases, the techniques described herein include receiving text data, segmenting the text data into multiple segments, assigning each segment to a category, generating a prompt for each segment based on the segment's category, extracting field values from each segment using the generated prompt, validating or rejecting the extracted field values based on category-specific validation rules, and routing the validated field values to category-specific target databases and/or reviewer platforms based on the validation results.

Figure 1:
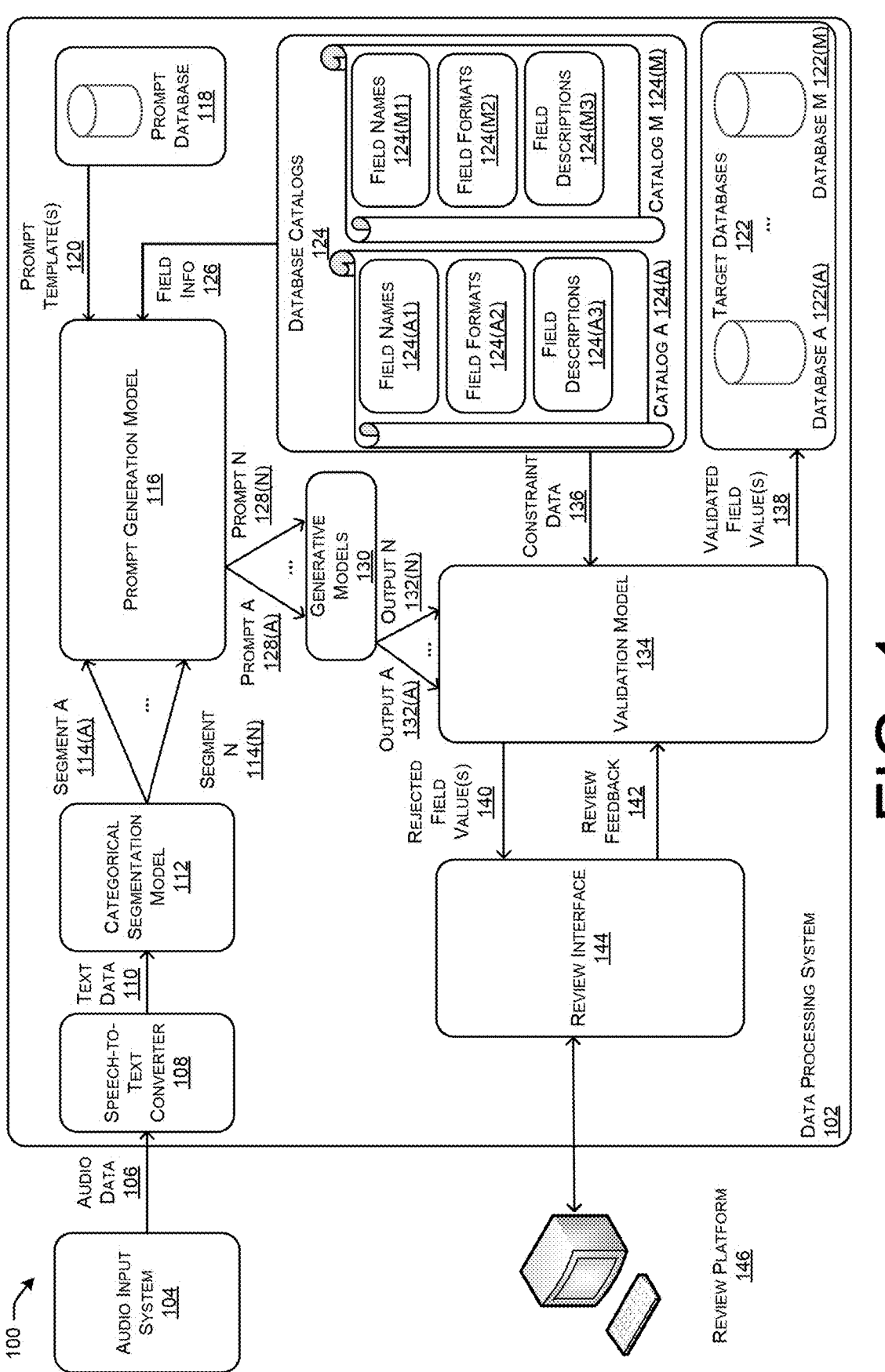
FIG. 1 provides an example environment for automated data extraction, validation, and routing based on unstructured text data.

FIG. 1 provides an example environment 100 for automated data extraction, validation, and routing based on unstructured text data. As depicted in FIG. 1, the environment 100 includes an audio input system 104 that is configured to generate (e.g., record and/or receive) audio data 106 and provide the audio data 106 to a speech-to-text converter 108 in a data processing system 102. The speech-to-text converter 108 may be configured to generate text data 110 based on the audio data 106. However, while the example implementation provided in FIG. 1 depicts receiving text data by performing speech-to-text conversion on audio data 106, a person of ordinary skill in the relevant technology will recognize that the text data 110 may be generated and/or received using one or more other techniques. For example, in some implementations, the text data 110 may not be the transcribed version of the audio data 106.

The audio input system 104 may be a server computing device associated with a communication service, such as a communication service that enables users to communicate using audio and/or video data. For example, users may provide audio and/or video data to the audio input system 104 using microphones and/or webcams. In some cases, a user may connect to a communication session using a computing device associated with the user. After connecting to the communication session, the user device may provide audio data and/or video data to the server computing device associated with the communication service. The user device may also receive at least one of audio data or video data from the server computing device.

The audio input system 104 may generate the audio data 106 by recording one or more sounds (e.g., verbal communications) detected during a communication session. In some cases, after termination of a communication session between a set of users, the audio input system 104 generates a file containing the audio data 106 associated with the communication session and provides the file to the data processing system 102. The audio data 106 may include records of one or more sounds (e.g., verbal communications) exchanged between the participants in the communication session. The audio data 106 may, for example, include audio data associated with a communication session, such as audio data associated with an audio conference or audio data associated with an audiovisual conference. The data processing system 102 may receive the audio data 106 by querying an application programming interface (API) associated with the audio input system.

After receiving the audio data 106, the data processing system 102 may process the audio data 106 to generate corresponding text data 110. Specifically, a speech-to-text converter 108 of the data processing system 102 may process the audio data 106 to generate the text data 110. The text data 110 may include a transcript of a conversation associated with a corresponding communication session whose verbal utterances are captured by the audio data 106. The text data 110 may be an electronic file, such as an electronic file including text indicative of a customer interaction (e.g., a transcript of a customer interaction, such as a transcript of a customer call). The text data may include a transcript of an audiovisual recording.

In some cases, the speech-to-text converter 108 may include an automated speech recognition software such as at least one of an acoustic model or a language model to translate the sound(s) associated with the audio data 106 into corresponding text data 110. For example, the speech-to-text converter 108 may utilize a neural network-based acoustic model and/or a neural network-based language model trained on large volumes of training data. The training data may represent one or more pairings of audio data segments to text data segments.

As another example, the speech-to-text converter 108 may determine the text data 110 associated with the audio data 106 using at least one of a convolutional neural network, a recurrent neural network, or an encoder-decoder model that is configured to encode the audio data 106 using an encoder model and determine the text data 110 by processing the encoding using a decoder model. In some cases, the text data 110 includes not only words and/or lexical constructs detected in the verbal utterances captured by the audio data 106, but also one or more semantic structure indicators (e.g., paragraph indicators, punctuation symbols, and/or the like) that are embedded into the words and/or lexical constructs. For example, the speech-to-text converter 108 may use one or more linguistic rules and/or heuristics, or a trained language model, to determine the semantic structure indicators embedded into the text data 110.

While the example implementation depicted in FIG. 1 depicts that the text data 110 is generated based on the audio data 106 received from the audio input system 104, a person of ordinary skill in the relevant technology will recognize that the text data 110 may in some cases be based on sources other than audio data. For example, in some cases, the text data 110 may include text data other than the transcript of a recorded communication session. Such text data 110 may, for example, be retrieved from a database. In an example embodiment, the text data 110 includes contents of an article stored on a database and retrieved by the data processing system 102 from that database.

Additionally, while the example implementation depicted in FIG. 1 depicts that the speech-to-text converter 108 is part of the data processing system 102, a person of ordinary skill in the relevant technology will recognize that the speech-to-text converter 108 may in some cases be part of another system such as the audio input system 104. For example, the audio input system 104 may generate the audio data 106, process the audio data 106 using the speech-to-text converter 108 to generate text data 110 (e.g., transcript of a recorded communication session associated with the audio data 106), and provide the generated text data 110 to the summarization system. As another example, the audio input system 104 may be part of a third system other than the data processing system 102 and the audio input system 104. As another example, different components of the audio input system 104 may be distributed across two or more systems, such as two or more systems including at least one of the data processing system 102, the audio input system 104, or a third system other than the data processing system 102 and the audio input system 104 (e.g., a third system that stores the speech-to-text converter 108). In some cases, at least two of the data processing system 102, the audio input system 104, or a third system other than the data processing system 102 and the audio input system 104 (e.g., a third system that stores the speech-to-text converter 108) may be different components of the same overall computing environment.

After the data processing system 102 receives and/or generates the text data 110, the data processing system 102 performs one or more data processing operations on the text data 110. For example, the data processing system 102 may be configured to: (i) extract one or more field values based on the text data 110, (ii) validate the extracted field value(s), and (iii) route each extracted field value to one or more of one of the target databases 122 or a reviewer platform 146 based on the validation result associated with that value. The data processing system 102 may be configured to perform field value extraction, validation, and/or routing operations based on one or more categories associated with the text data 110, such as one or more categories associated with one or more segments (e.g., portions) of the text data 110 as determined by the categorical segmentation model 112.

The categorical segmentation model 112 may be configured to segment the text data 110 into one or more segments and determine a categorical designation for each determined text segment. For example, as depicted in FIG. 1, the categorical segmentation model 112 has segmented the text data 110 into N segments, each associated with one of N segment categories. The N segments include a segment A 114(A) and a segment N 114(N). In one example, the categorical segmentation model 112 may segment a customer call transcript into a first segment associated with a customer service inquiry, a second segment associated with a billing question, and a third segment associated with a technical support issue. As another example, the categorical segmentation model 112 may segment an insurance policyholder call transcript into a first segment associated with a car insurance product, a second segment associated with a home insurance product, and a third segment associated with a health insurance product. In some cases, the categorical segmentation model 112 assigns the entire text data into a single text segment and/or a single segment category. A segment category may represent an intent of customer interaction and/or a sentiment of customer interaction represented by the corresponding segment.

The categorical segmentation model 112 may be both a segmentation model and a classifier model (e.g., a classifier machine learning model). For example, the categorical segmentation model 112 may first segment the text data 110 into N segments and then assign a category from a set of predefined segment categories to each of the N determined text segments. The segmentation stage may be performed based on one or more lexical and/or semantic signals in the text data 110, such as based on a distribution of lexical tokens across different portions of the text data 110. The segmentation stage may include performing topic modeling on the text data 110, for example, using Latent Dirichlet Allocation (LDA) or Non-negative Matrix Factorization (NMF). The categorical classification stage of the operations associated with the categorical segmentation model 112 may include classifying each segment into one or more segment categories from a set of predefined categories. The classification stage may include processing a determined text segment using one or more classification models, such as using one or more of a Support Vector Machine (SVM) model, a Naïve Bayes model, a Convolutional Neural Network (CNN) model, or a Recurrent Neural Network (RNN) model. A classification model may be trained based on data associating a text segment with a training label identifying a ground-truth category.

As described above, the categorical segmentation model 112 may assign each segment of text data 110 to a segment category selected from a predefined set of segment categories (e.g., a predefined schema and/or taxonomy of segment categories). The predefined set of segment categories may in turn be mapped to one of M target databases 122, such that the fields associated with a segment category may (e.g., if validated and/or approved after review) be stored on one of the M target databases 122. For example, the data processing system 102 may store validated and/or reviewer-approved field values extracted from a text segment associated with a customer service inquiry on a first target database, validated and/or reviewer-approved field values extracted from a text segment associated with a billing question on a second target database, and validated and/or reviewer-approved field values extracted from a text segment associated with a technical support issue on a third target database. As another example, the data processing system 102 may store validated and/or reviewer-approved field values extracted from a text segment associated with a car insurance product and a text segment associated with a home insurance product on a first target database, validated and/or reviewer-approved field values extracted from a text segment associated with a health insurance product on a second target database, and validated and/or reviewer-approved field values extracted from a text segment associated with a life insurance product on a third target database.

Accordingly, the data processing system 102 may maintain a mapping of the predefined segment categories to target databases 122. This mapping may, for example, be a one-to-one mapping and/or a one-to-many mapping. In accordance with a one-to-one mapping, field values associated with each predefined segment category are stored on a single one of the target databases 122 and each target database may store field values associated with a single predefined segment category. In accordance with a one-to-many mapping, field values associated with each predefined segment category are stored on a single one of the target databases 122 and each target database may store field values associated with one or more predefined segment categories.

After the categorical segmentation model 112 determines N segments of text data each associated with a segment category, the prompt generation model 116 generates N prompts each associated with one of the N segment categories. The prompt generation model 116 may generate, for each of the N determined segment categories, a respective prompt. For example, as depicted in FIG. 1, the prompt generation model 116 generates a prompt A 128(A) associated with the segment A 114(A) and a prompt N 128(N) associated with the segment N 114(N).

To generate a prompt associated with a text segment, the prompt generation model 116 may: (i) retrieve one or more prompt templates 120 from the prompt database 118, (ii) retrieve field information 126 associated with the text segment from the database catalogs 124, and (iii) generate the prompt based on the one or more prompt templates 120 and the field information 126. A prompt template may identify static text data and one or more dynamic fields. The static text data may represent text data identifying that the prompt template is associated with a field value extraction task. The dynamic fields may include a dynamic field representing the text data 110 based on which field value extraction is performed, a name of a field whose value is to be extracted based on the text data 110, and/or a description of a field whose value is to be extracted based on the text data 110.

For example, a prompt template may represent the following sequence of lexical tokens and data field identifiers: "Given the following customer call transcript text, please extract the specified field values. The fields to be extracted include [Field1], [Field2], and [Field]. where [Field1] is described as [Description1], [Field2] as [Description2], and [Field3] as [Description3]. The desired output format is a JavaScript Object Notation (JSON) object where each field name is a key, and the corresponding field value is the extracted value from the transcript. Please ensure the extracted values are accurate and match the descriptions provided. The text of the transcript is as follows: [TrasncriptText]." In this prompt template: (i) [Field1], [Field2], and [Field3] are dynamic field identifiers corresponding to the field names for three target data fields, (ii) [Description1], [Description2], [Description3] are dynamic field identifiers corresponding to the field descriptions for three target data fields, and (iii) [TranscriptText] is a dynamic field corresponding the text of a transcript segment.

Based on the example prompt template provided in the preceding paragraph, the prompt generation model 116 may generate a prompt that includes "Given the following customer call transcript text, please extract the specified field values. The fields to be extracted include "Vehicle Make," "Vehicle Model," and "Vehicle Year," where "Vehicle Make" is described as "Manufacturer of the Vehicle," "Vehicle Model" is described as "Model of the Vehicle," and "Vehicle Year" is described as "Year the Vehicle Was Manufactured." The desired output format is a JavaScript Object Notation (JSON) object where each field name is a key, and the corresponding field value is the extracted value from the transcript. Please ensure the extracted values are accurate and match the descriptions provided. The text of the transcript is as follows:" followed by the transcript segment text. As this example prompt illustrates, to generate a prompt, the prompt generation model 116 may replace the dynamic field identifiers with corresponding data field names, descriptions, and/or text segments.

As another example, a prompt template may represent the following sequence of lexical tokens and data field identifiers: "Given the following customer call transcript text, please extract the specified field values. The fields to be extracted include various fields with their corresponding descriptions provided below. The desired output format is a JavaScript Object Notation (JSON) object where each field name is a key, and the corresponding field value is the extracted value from the transcript. Please ensure the extracted values are accurate and match the descriptions provided. Fields to Extract: [{% for field in fields %} {{field.name }}:{{field.description}}{% endfor %}]. Transcript Text: [TranscriptText]." In this prompt template, (i) [TranscriptText] is a dynamic field corresponding to the text of a transcript segment, and (ii) [{% for field in fields %} {{field.name}}: {{field.description}}{% endfor %}] is a dynamic field corresponding to a variable number of key-value pairs where a key and a variable in a key-value pair corresponds to a field name and a field description associated with a field name, respectively.

Based on the example prompt template provided in the preceding paragraph, the prompt generation model 116 may generate a prompt that includes "Given the following customer call transcript text, please extract the specified field values. The fields to be extracted include "Vehicle Make," "Vehicle Model," "Vehicle Year," "VIN," and "Purchase Date," where "Vehicle Make" is described as "Manufacturer of the Vehicle," "Vehicle Model" is described as "Model of the Vehicle," "Vehicle Year" is described as "Year the Vehicle Was Manufactured," "VIN" is described as "Vehicle Identifier Number," and "Purchase Date" is described as "Date the Vehicle was Purchased." The desired output format is a JavaScript Object Notation (JSON) object where each field name is a key, and the corresponding field value is the extracted value from the transcript. Please ensure the extracted values are accurate and match the descriptions provided. The text of the transcript is as follows:" followed by the transcript segment text. As this example prompt illustrates, to generate a prompt, the prompt generation model 116 may replace the dynamic field identifiers by corresponding data field names, descriptions, and/or text segments.

Accordingly, the prompt generation model 116 may generate a prompt associated with a determined segment of text data 110 based on one or more prompt templates 120, the determined text segment, and/or field information (e.g., field names, field formats, and/or field descriptions) associated with one or more target data fields (e.g., one or more data fields whose values the data processing system 102 aims to extract from a text segment of the text data 110). In some cases, the prompt database 118 may include a respective prompt template for each defined segment category. For example, the prompt database 118 may include a respective prompt template for extracting field values from text segments associated with a customer service category, a respective prompt template for extracting field values from text segments associated with a billing category, a respective prompt template for extracting field values from text segments associated with a technical support category, and so on. In some cases, the prompt database 118 may include a single prompt template for all field value extraction tasks regardless of segment category. For example, the prompt database 118 may include a single prompt template for extracting field values from text segments associated with a customer service category, for extracting field values from text segments associated with a billing category, for extracting field values from text segments associated with a technical support category, and so on.

A prompt template may include dynamic fields corresponding to data field information, such as corresponding to field names and/or field descriptions associated with one or more target data fields. The prompt generation model 116 may determine the values corresponding to such dynamic fields based on field information 126 retrieved from M database catalogs 124. A database catalog may be associated with a respective target database and include, for each database field whose values may be stored on the respective target database, field information (e.g., the field name, the field format, and/or the field description) associated with that field. For example, as depicted in FIG. 1, the catalog A 124(A) may include field names 124(A1), field formats 124(A2), and field descriptions 124(A3) associated with the data fields whose values may be stored on database A 122(A), while the catalog B 124(B) may include field names 124(B1), field formats 124(B2), and field descriptions 124 (B3) associated with the data fields whose values may be stored on database A 122(A).

Accordingly, a database catalog may store, for each field name whose values may be stored on a respective target database, the field's name, format, and description. The name of the field may be a string and/or identifier used to uniquely identify the field within a schema associated with the respective target database (e.g., a schema associated with a table in the respective target database). For example, a field associated with storing customer names may have a field name "customer_name." The format of a field may represent a constraint on a data type and/or data values that may be stored in association with the field (e.g., a range of valid values for the data field). For example, the format of a field may represent that the field is expected to be associated with string values. As another example, the format of a field may represent that the field is expected to be associated with object values. As another example, the format of a field may represent that the field is expected to be associated with numeric values. As another example, the format of a field may represent that the field is expected to be associated with strings that satisfy one of one or more defined patterns (e.g., as defined using one or more regular expressions). The description of a field represents a textual explanation of the purpose and/or type of the data that the field is associated with. For example, the description of a "customer_name" field may be "The name of a customer who has made the customer call." The description of a field may additionally and/or alternatively include instructions for extracting values corresponding to the field. For example, the description of a "customer_name" field may be "The customer name is usually explained in the beginning of the call and is expressed in response to a question similar to 'what's the customer name on the record?'"

To generate a prompt associated with a specific text segment, the prompt generation model 116 may: (i) identify the category associated with the specific text segment (e.g., as determined by the categorical segmentation model 112), (ii) identify the target database associated with the identified segment category, (iii) identify the database catalog associated with the identified target database, (iv) retrieve the field information 126 from the identified database catalog, (iv) retrieve a prompt template from the prompt database 118, and (v) generate the prompt based on incorporating the field information 126 into the prompt template. In some cases, the prompt generation model 116 may incorporate the field names, formats, and/or descriptions represented by the respective database catalog into the prompt template to generate a customized prompt tailored to extracting the desired field values.

For example, the prompt generation model 116 may identify that a first text segment is associated with a customer service inquiry. The prompt generation model 116 may then determine that the customer service inquiry category is associated with a customer service database. The prompt generation model 116 may then determine that the catalog associated with the customer service database specifies a "customer_name" field along with a first field description, a "customer_id" field along with a second field description, and a "reason_code" field along with a third field description. The prompt generation model 116 may then extract a prompt template that includes placeholders for field names and field descriptions. The prompt generation model 116 may then generate a prompt by replacing the placeholders in the prompt template with field names and field descriptions extracted from the customer service database's catalog.

Accordingly, given N determined text segments of the text data 110, the prompt generation model 116 generates N prompts each associated with a respective one of the N text segments. The prompt generation model 116 may then provide the N prompts to one or more generative models 130. The generative models 130 may process the N prompts (e.g., using N inferences) to generate N outputs, such as output A 132(A) and output N 132(N). For example, the generative models 130 may process the prompt A 128(A), determined based on the segment A 114(A), to determine an output A 132(A). As another example, the generative models may process the prompt N 128(N), determined based on the segment N 114(N), to determine an output N 132(N).

A generative model (e.g., a generative machine learning model) may be a trained machine learning model that is configured to process a prompt to generate an output. The output of a generative model may identify one or more fields extracted from a text segment included in and/or identified by the prompt. In some cases, a generative model is a transformer-based model, such as a transformer-based model that uses an attention mechanism (e.g., a self-attention mechanism). In some cases, a generative model is a diffusion model, such as a diffusion model. In some cases, the generative model may be configured to (e.g., in addition to extracting field values from a text segment) provide a summary of the text segment and/or a predicted sentiment of the text segment.

The data processing system 102 may maintain a single generative model or more than one generative model. For example, in some cases, the data processing system 102 may process the prompts associated with all text segments using a single generative model. As another example, in some cases, the data processing system 102 may process the prompts associated with text segments with a first designated segment category using a first generative model, the prompts associated with text segments with a second designated segment category using a second generative model, and so on. Accordingly, in some cases, prior to processing a prompt by a generative model, the data processing system 102 may first select one of the generative models 130 to process that specific prompt, for example, based on the segment category associated with that prompt.

Accordingly, given N prompts (e.g., N prompts associated with N determined segments of the text data 110), the generative models 130 may process the N prompts to generate N outputs (e.g., a respective output associated with each of the N prompts). The generative models 130 may then provide the N prompts to the validation model 134. The validation model 134 may be configured to: (i) identify an extracted field value identified by a generative model output, (ii) determine whether the extracted value satisfies one or more constraints associated with that value (e.g., as identified by the corresponding data field's name and/or format requirements), and (iii) route the extracted field value to one of the target databases 122 or the reviewer platform 146 based on the determination made in (ii).

As described above, an output generated by the generative models 130 based on a given prompt may represent one or more field values extracted based on a text segment associated with that given prompt. The validation model 134 may be configured to validate each field value based on one or more constraints associated with the data field corresponding to that field value. For example, the validation model 134 may determine whether a field value identified by a generative model output and associated with a corresponding data field is valid based on: (i) whether the field value satisfies a format associated with the corresponding data field, and/or (ii) whether the generative model output identifies the field value with the appropriate field name of the corresponding data field. In some cases, the validation model may validate a field value identified by a generative model output and associated with a corresponding data field if both: (i) the field value satisfies a format associated with the corresponding data field, and (ii) the generative model output identifies the field value with the accurate field of the corresponding data field. In some cases, the validation model may reject a field value identified by a generative model output and associated with a corresponding data field if either: (i) the field value satisfies a format associated with the corresponding data field, or (ii) the generative model output identifies the field value with the accurate field of the corresponding data field.

For example, a generative model may process a prompt that requests identifying a VIN field, a vehicle make field, and a vehicle model field. The prompt may identify the VIN field with the field name "VIN" and with a numerical value format, the vehicle make field with the field name "Make" and with a text value format, and the vehicle model field with the field name "Model" and with a text value format. Based on processing the prompt, the generative model may generate an output that indicates: (i) a first field value "1G1BL52P7TR115520" identified by the field name "VIN", (ii) a second field value "Chevrolet" identified by the field name "Make", and (iii) a third field value "Camaro" identified by the field name "Model."

After receiving this generative model output, the validation model 134 may validate each of the three field values based on the constraints associated with their corresponding data fields. For the first field value "1G1BL52P7TR115520" associated with the "VIN" field, the validation model 134 may determine that: (i) the field value satisfies the numerical value format associated with the VIN field, and (ii) the generative model output correctly identifies the field value with the accurate field name "VIN." Accordingly, the validation model 134 may validate the first field value as a valid VIN field value.

Additionally, for the second field value "Chevrolet" associated with the "Make" field, the validation model 134 may determine that: (i) the field value satisfies the text value format associated with the vehicle make field, and (ii) the generative model output correctly identifies the field value with the accurate field name "Make." Accordingly, the validation model 134 may validate the second field value as a valid vehicle make field value.

Additionally, for the third field value "Camaro" associated with the "Model" field, the validation model 134 may determine that: (i) the field value satisfies the text value format associated with the vehicle model field, and (ii) the generative model output correctly identifies the field value with the accurate field name "Model." Accordingly, the validation model 134 may validate the third field value as a valid vehicle model field value.

However, if any of the field values fail to meet the associated constraints, the validation model 134 may reject that field value. For example, if the generative model output includes a field value "ABC123" associated with the "VIN" field, the validation model 134 may reject this field value because it does not satisfy the numerical value format associated with the VIN field, even if the generative model output identifies the field value with the correct field name "VIN." Similarly, if the generative model output includes a field value "Chevrolet" but associates it with an incorrect field name like "Brand" instead of "Make", the validation model 134 may reject this field value because the generative model output fails to identify the field value with the accurate field name of the corresponding data field, even though the field value itself satisfies the text value format associated with the vehicle make field.

Accordingly, the validation model 134 may validate an extracted field value identified by a generative model output and associated with a corresponding data field based on one or more constraints, including one or more constraints associated with (e.g., characterized by) the field information (e.g., field names and/or field values) associated with the corresponding data field. Therefore, to validate the extracted data fields identified by N generative model outputs, the validation model 134 may retrieve constraint definition data 136 from the database catalogs 124. Such constraint definition data 136 may, for example, represent field formats and/or field formats associated with the input prompts, as described by the database catalogs associated with those input prompts.

In some cases, to validate the field values identified by a generative model output generated based on a prompt, the validation model 134: (i) identifies the text segment associated with the prompt, (ii) identifies the segment category associated with the identified segment, (iii) identifies the target database associated with the identified segment category, (iv) identifies the database catalog associated with the identified target database, (v) retrieves constraint definition data (e.g., field names and/or field values) from the identified catalog, and (vi) determines whether to validate each field value based on whether the field value satisfies one or more constraints defined by the constraint definition data. Accordingly, after performing the validation operations, the validation model 134 may generate a validation result for each field value that indicates whether the field value is validated or rejected based on whether the field value satisfies one or more constraints associated with the constraint definition data retrieved from the relevant database catalog.

For example, a generative model may process a generative model output that includes an extracted account number value of "1234567890" that is designated with a field name "Account Number," an extracted outstanding amount value of "200.30" that is designated with a field name "Remaining Payment," and an extracted due date value "13/13/2024" that is designated with a field name "Due Date." The validation model 134 may process this output by first identifying that the generative model output is associated with a billing category. The validation model 134 may then retrieve, from a database catalog associated with a billing database, constraint definition data identifying that the account number field is associated with the field name "Account Number" and a ten-digit integer value format, the outstanding amount field is associated with the "Outstanding Amount" field name and a double-precision floating point format, and the due date field is associated with a "Due Date" field name and a "YYYY-MM-DD" format. Based on these constraint definition data, the validation model 134 may determine that the extracted account number value of "1234567890" is: (i) associated with a first constraint requiring a designated field name of "Account Number" and a second constraint requiring a ten-digit integer value format, and (ii) is assigned a positive validation result because it satisfies both constraints. Moreover, the validation model 134 may determine that the extracted outstanding amount value of "200.30" is: (i) associated with a first constraint requiring a designated field name of "Outstanding Amount" and a second constraint requiring a double-precision floating point format, and (ii) is assigned a negative validation result because, while it satisfies the second constraint, it fails to satisfy the first constraint due to being designated with the incorrect field name "Remaining Payment". Furthermore, the validation model 134 may determine that the extracted due date value "13/13/2024" is: (i) associated with a first constraint requiring a designated field name of "Due Date" and a second constraint requiring a "YYYY-MM-DD" format, and (ii) is assigned a negative validation result because, while it satisfies the first constraint, it fails to satisfy the second constraint due to having an invalid date format.

Accordingly, given a generative model output generated based on a prompt that identifies F extracted field values, the validation model 134 determines F validation results, each associated with a respective one of the F extracted field values and indicating whether the respective one of the F extracted field values satisfies one or more constraints, such as one or more constraints based on the corresponding field information data. In some cases, after the validation model 134 determines the F validation results, the validation model 134 determines how to route the F extracted field values based on the F validation results. For example, in some cases, if an extracted field value is associated with a positive validation result, the validation model 134 determines that the extracted field value is valid and routes the extracted field value to one of the target database 122 (e.g., the target database associated with the segment category corresponding to the prompt). However, if an extracted field value is associated with a negative validation result, the validation model 134 determines that the extracted field value is valid and routes the extracted field value to the reviewer platform 146 via the review interface 144.

For example, a generative model may process a generative model output that includes an extracted account number value of "1234567890", an extracted outstanding amount value of "200.30," and an extracted due date value "13/13/ 2024." The validation model 134 may determine that the extracted account number value is associated with a positive validation result, the extracted outstanding amount value is associated with a negative validation determination, and the extracted due date value is associated with a negative validation determination. Based on these determinations, the validation model 134 may route the extracted account number value to a target database (e.g., to the billing database), while routing the extracted outstanding amount value and the extracted due date value to the reviewer platform 146 via the review interface 144.

In some cases, given a generative model output generated based on a prompt that identifies F extracted field values, the validation model 134 validates the F extracted field values if all of the F validation results associated with those F extracted field values are positive validation results. Accordingly, if any one or more of the F validation results are negative validation results, the validation model 134 rejects all of the F extracted field values. For example, in the example described in the preceding paragraph, the validation model, the validation model 134 may route the extracted account number value, the extracted outstanding amount value, and the extracted due date value to the reviewer platform 146 via the review interface 144, because the latter two values are associated with negative validation results even though the first value is associated with a positive validation result.

Accordingly, the validation model 134 may determine whether to validate and/or reject a field value identified by a generative model output based on the validation result associated with that field value and/or validation results associated with other field values identified by the same generative model output. After performing these validation operations, the validation model 134 may: (i) route one or more validated field values 138 to the target databases 122, and/or (ii) route one or more rejected field values 140 to the reviewer platform 146 via the review interface 144.

Routing a validated field value to the target databases 122 may include storing the validated field value on a target database associated with the corresponding segment category. As described above, each segment category may be associated with a specific target database, and the validation model 134 may identify the appropriate target database for storing a validated field value based on the segment category associated with the text segment from which the field value was extracted. For example, if a validated field value is extracted from a text segment associated with a billing category, the validation model 134 may route the validated field value to a billing database associated with the billing category.

If the validation model 134 fails to validate an extracted data field, the validation model 134 may route the rejected field to the review interface 144. The review interface 144 may be a user interface (e.g., a webpage) that enables one or more reviewers (e.g., one or more human reviewers, such as one or more expert reviewers) to review and/or correct the rejected field value. For example, the review interface 144 may display the text segment from which a rejected field value was extracted, the rejected field value itself, and/or the reason for rejecting the field value (e.g., the constraint(s) that the rejected field value failed to satisfy). The review interface 144 may prompt the reviewer to either confirm the rejected field value (e.g., if the reviewer determines that the field value is valid despite failing to meet the designated constraint(s)) and/or to provide a corrected field value. The reviewer(s) may connect to the review interface 144 by a reviewer platform 146, which may be a computing device such as a user device (e.g., a personal computer device).

In some cases, the review interface 144 may display multiple rejected field values 140 to a reviewer, such as multiple rejected field values that were extracted from the same text segment and/or multiple rejected field values that failed to meet the same constraint(s). The reviewer may then review the multiple rejected field values and provide review feedback 142 (e.g., confirmation, rejection, and/or correction for each of the rejected field values) to the validation model 134. In some cases, after the human reviewer has validated a set of rejected field value(s), the review interface 144 may provide the validated field value(s) back to the validation model 134. The validation model 134 may then route the validated field value(s) 138 to one or more of the target databases 122 for storage.

Accordingly, the environment 100 may combine various elements to enable automated extraction, validation, and routing of data from unstructured text to structured databases. For example, the speech-to-text converter 108 generates text data 110 based on audio data 106 provided by the audio input system 104. Afterward, the categorical segmentation model 112 may divide the text data 110 into segments, each associated with a corresponding segment category. Afterward, the prompt generation model 116 may generate, for each segment of the text data 110, a customized prompt using field information 126 from a corresponding database catalog 124 as well as a prompt template retrieved from the prompt database 118. These prompts may then be processed by generative models 130 to extract field values from the text segments. The extracted field values may then be validated by a validation model 134 using constraint definition data 136 retrieved from the relevant database catalogs 124. Field values that satisfy the constraints are routed as validated field values 138 to the appropriate target databases 122 based on their segment categories. Field values that fail validation are routed as rejected field values 140 to a reviewer platform 146 via a review interface 144 for manual review. This combination of elements in the environment 100 may enable the automated processing of unstructured text data into structured data records, with validation and routing to ensure data quality and proper storage in the relevant databases, while allowing for human review of data that fails automated validation.

The environment 100 may enable improving the accuracy and reliability of storing text data 110 in a structured manner. For example, the use of the categorical segmentation model 112 to segment the text data 110 into distinct segments based on segment categories may increase the likelihood that the appropriate fields and formats are applied to each segment during the extraction and validation process. By tailoring the prompts and/or validation rules to the specific category of each text segment, the environment 100 can improve the accuracy, precision, and/or relevance of the extracted data.

Additionally, the environment 100 may improve the computational efficiency of storing text data 110 in a structured manner. For example, by using the categorical segmentation model 112 to divide the text data 110 into smaller and/or more focused segments, the environment 100 can reduce the complexity and/or processing time required for extracting field values from the text data 110. In some cases, instead of applying the generative models 130 and/or validation model 134 to the entire text data 110 at once, one or both these models may operate on shorter, category-specific segments, which can lead to faster processing and more efficient use of computational resources. These computational and/or processing time savings may be increased if the text segments are processed in parallel. For example, the environment 100 may process multiple text segments simultaneously using parallel computing techniques, such as using multi-threading and/or using distributed computing. By assigning each text segment to a separate processing thread and/or node, the environment 100 can extract field values from multiple segments concurrently, rather than processing the segments sequentially. This parallel processing approach may significantly reduce the overall time required to process the entire text data 110, especially for large volumes of text data 110.

Figure 2:
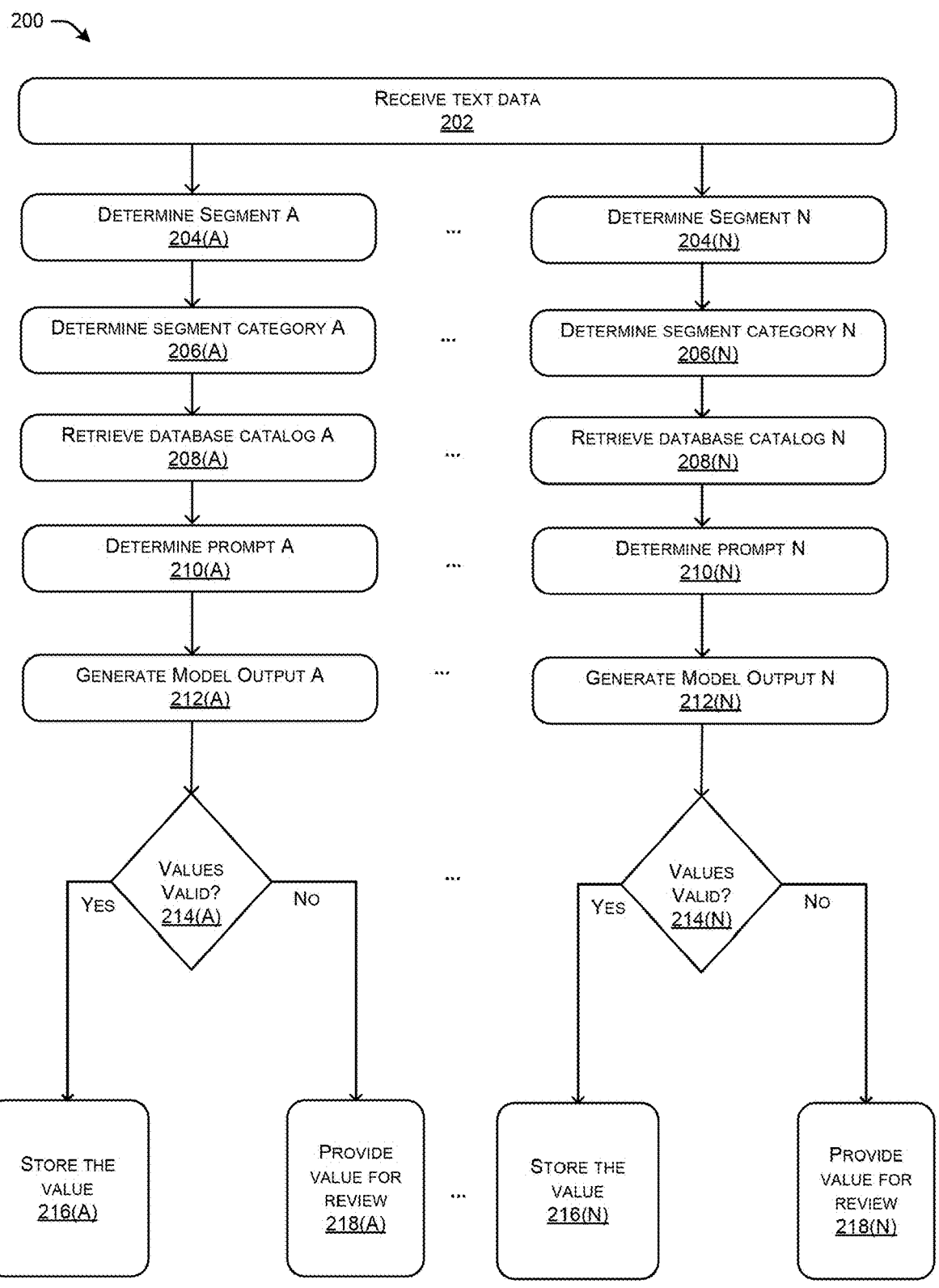
FIG. 2 is a flowchart diagram of an example process for performing conditional routing of text data.

FIG. 2 is a flowchart diagram of an example process 200 for performing conditional routing of text data 110. The process 200 may be performed by various components of the data processing system 102 to conditionally route multiple segments of text data 110.

As depicted in FIG. 2, at operation 202, the categorical segmentation model 112 receives the text data 110. For example, the categorical segmentation model 112 may receive the text data 110 from the speech-to-text converter 108. The speech-to-text converter 108 may generate the text data 110 by performing an audio-to-text conversion on audio data 106 received from the audio input system 104. However, while the example implementation provided in FIG. 1 depicts receiving text data by performing speech-to-text conversion on audio data 106, a person of ordinary skill in the relevant technology will recognize that the text data 110 may be generated and/or received using one or more other techniques. For example, the text data 110 may be retrieved from a database and/or may be input by a user (e.g., using a text editing software and/or web interface).

After the categorical segmentation model 112 receives the text data 110, the categorical segmentation model 112 determines N segments of the text data 110. For example, the categorical segmentation model 112 may determine a segment A at operation 204(A) and a segment N at operation 204(N). The categorical segmentation model 112 may determine the N segments by performing topic modeling on the text data 110, for example using LDA and/or NMF techniques.

After the categorical segmentation model 112 determines N segments of the text data 110, the categorical segmentation model 112 determines N segment categories for the N text data segments. For example, the categorical segmentation model 112 may determine a segment category A associated with the segment A at operation 206(A) and a segment category N associated with the operation N at operation 206(N). The categorical segmentation model 112 may assign a segment category to a text data segment using a trained classification model, such as using a trained classification model that uses at least one of an RNN, CNN, or a transformer-based model.

After the categorical segmentation model 112 determines N segment categories for the N text data segments, the prompt generation model 116 retrieves N database catalogs. For example, the prompt generation model 116 may retrieve a database catalog A associated with the segment A at operation 208(A) and a database catalog N associated with the segment N at operation 208(N). The prompt generation model 116 may, for each text data segment: (i) identify a target database that is associated with the segment category corresponding to the text data segment, and (ii) retrieve the database catalog for the identified text data segment.

After the prompt generation model 116 retrieves N database catalogs, the prompt generation model 116 determines N prompts for the N text data segments. For example, the prompt generation model 116 may generate a prompt A at operation 210(A) by inserting data retrieved from the catalog A into a prompt template. As another example, the prompt generation model 116 may generate a prompt N at operation 210(N) by inserting data retrieved from the catalog N into a prompt template. The prompt generation model 116 may, for each text data segment: (i) retrieve a prompt template identifying a set of dynamic fields, and (ii) incorporate data determined based on the corresponding database catalog into the prompt template and in association with the dynamic fields.

After the prompt generation model 116 determines N prompts for the N text data segments, the generative models 130 process the N prompts to generative N generative model outputs. For example, the generative models 130 may generate a generative output A based on the prompt A at operation 212(A) and a generative output N based on the prompt N at operation 212(N). In some cases, all of the N prompts are processed by the same generative model, while in other cases a first subset (e.g., a first one) of the N prompts is processed by a first generative model, a second subset (e.g., a second one) of the N prompts is processed by a second generative model, and so on.

After the generative models 130 process the N prompts to generative N generative model outputs, the validation model 134 performs the following for each of the N text data segments: (i) determine whether the extracted field value(s) identified by the corresponding generative model output are valid, (ii) if the validation model 134 determines that the extracted field value(s) identified by the corresponding generative model output are valid, stores the extracted field value(s) on the target databases 122, and (iii) if the validation model 134 determines that the extracted field value(s) identified by the corresponding generative model output are invalid, routes the extracted field value(s) to a reviewer platform 146. Example techniques for determining whether extracted field values are valid, for routing validated field values to target databases 122, and for routing rejected field values to the reviewer platform 146 are described above. The validation model 134 may store metadata associated with the text data 110 on the target databases 122. The metadata may represent one or more data values extracted from the text data 110. The metadata may also represent, for each extracted data value, the corresponding data field.

For example, after the generative models 130 generates a generative output A based on the prompt A at operation 212(A), the validation model 134 determines (at operation 214(A)) whether the extracted field value(s) identified by the generative output A are valid. If the validation model 134 determines that the extracted field value(s) identified by the generative output A are valid (operation 214(A)—Yes), the validation model 134 stores (at operation 216(A)) the validated extracted field value(s) on the target database that is associated with the segment A. If the validation model 134 determines that the extracted field value(s) identified by the generative output A are valid (operation 214(A)—No), the validation model 134 routes (at operation 216(A)) the rejected field value(s) to the reviewer platform 146.

As another example, after the generative models 130 generates a generative output N based on the prompt N at operation 212(N), the validation model 134 determines (at operation 214(N)) whether the extracted field value(s) identified by the generative output N are valid. If the validation model 134 determines that the extracted field value(s) identified by the generative output N are valid (operation 214 (N)—Yes), the validation model 134 stores (at operation 216(N)) the validated extracted field value(s) on the target database that is associated with the segment N. If the validation model 134 determines that the extracted field value(s) identified by the generative output N are valid (operation 214(N)—No), the validation model 134 routes (at operation 216(N)) the rejected field value(s) to the reviewer platform 146.

Accordingly, the process 200 enables the data processing system 102 of FIG. 1 to conditionally route field values extracted from the text data 110 based on the segment categories assigned to segments of the text data 110. Specifically, for each text data segment, a prompt may be generated based on a data catalog associated with the segment's respective category. The prompt may then be processed to extract field values, and the field values may then be routed to the target databases 122 or the reviewer platform 146 based on whether the extracted field values are validated or rejected.

Figure 3:
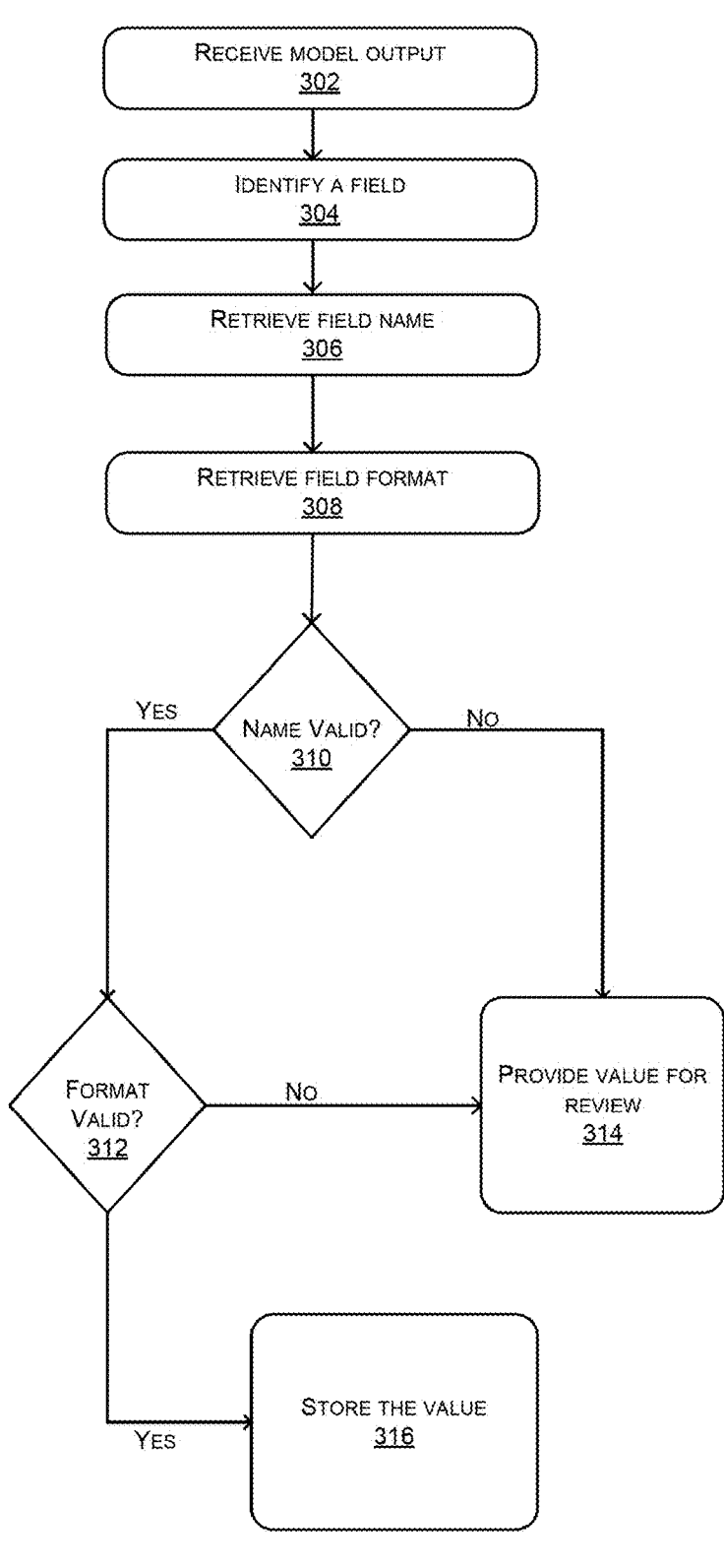
FIG. 3 is a flowchart diagram of an example process for validating an extracted data field identified by a generative model output.

FIG. 3 is a flowchart diagram of an example process 300 for validating an extracted data field identified by a generative model output. The process 300 may, for example, be performed by the validation model 134 of the data processing system 102.

At operation 302, the validation model 134 receives a generative model output. The generative model output may be generated by the generative models 130 based on a prompt generated by the prompt generation model 116. The prompt generation model 116 may generate the prompt based on a text data segment and/or field information 126 extracted from a database catalog associated with the segment's category.

At operation 304, the validation model 134 identifies an extracted field value from the generative model output. The validation model 134 may determine the extracted field value based on an expected output format of the generative prompt, for example as described in the input prompt provided to the generative models 130. For example, the input prompt may require that the extracted field value for a particular field be provided as the first extracted value provided by the generative model output and in the "[field_name: extracted_value]" format. Based on this requirement, the validation model 134 may extract the field value corresponding to the particular field as the first extracted value provided by the generative model output and after specifying the field name for the extracted field value.

At operation 306, the validation model 134 retrieves the required field name associated with the data field corresponding to the identified extracted field value. The required field name may be stored on a database catalog of a target database that is configured to store values corresponding to the data field associated with the identified value. The required name of the field may be a string and/or identifier used to uniquely identify the field within a schema associated with the respective target database.

At operation 308, the validation model 134 retrieves the required field format associated with the data field corresponding to the identified extracted field value. The required field format may be stored on a database catalog of a target database that is configured to store values corresponding to the data field associated with the identified value. The required format of a field may represent a constraint on a data type and/or data values that may be stored in association with the field.

At operation 310, the validation model 134 determines whether the output field name of the extracted field value, as represented by the generative model output, satisfies the required field name retrieved at operation 306. If the validation model 134 determines that the output field name of the extracted field value, as represented by the generative model output, satisfies the required field name (operation 310—Yes), the validation model 134 proceeds to operation 312. If the validation model 134 determines that the output field name of the extracted field value, as represented by the generative model output, fails to satisfy the required field name (operation 310—No), the validation model 134 proceeds to operation 314 to provide the extracted field value to the reviewer platform 146 (e.g., for manual review).

At operation 312, the validation model 134 determines whether the output field format of the extracted field value satisfies the required field format retrieved at operation 308. If the validation model 134 determines that the output field format of the extracted field value, as represented by the generative model output, satisfies the required field format (operation 312—Yes), the validation model 134 proceeds to operation 316 to store the extracted field value on a target database associated with the extracted field value. If the validation model 134 determines that the output field format of the extracted field value, as represented by the generative model output, fails to satisfy the required field format (operation 312—No), the validation model 134 proceeds to operation 314 to provide the extracted field value to the reviewer platform 146 (e.g., for manual review).

Accordingly, the process 300 enables the validation model 134 to conditionally validate an extracted field value based on: (i) whether the name of the extracted field value, as represented by a generative model output, satisfies a field name of the corresponding data field, as represented by a database catalog associated with a corresponding target database, and (ii) whether the format of the extracted field value satisfies a required field format for the corresponding data field, as represented by a database catalog associated with a corresponding target database. For example, in some cases, the validation model 134 validates the extracted value and store the validated value on a corresponding target database if both the field name constraint and the field format constraint are satisfied. As another example, in some cases, the validation model 134 rejects the extracted value and routes the rejected value to the reviewer platform 146 if either or both of the field name constraint or the field format constraint is not satisfied.

FIGS. 4-8 provide an operational example of conditionally validating and routing text data 400. Specifically, FIG.

4 depicts that a categorical segmentation model 112 may segment the text data 400 into a segment A 402(A) and a segment B 402(B). The text data 400 may, for example, be the transcript of a customer interaction (e.g., a customer call), such as a customer interaction with an insurance company. Each of the two determined segments may be associated with a distinct segment category. Segment A 402(A) may, for example, be associated with a car insurance category, while segment B 402(B) may be associated with a home insurance category.

After the categorical segmentation model 112 determines the segment A 402(A) associated with the car insurance category and the segment B 402(B) associated with the home insurance category, the prompt generation model 116 may retrieve a first database catalog for a target database associated with the car insurance category and a second database catalog for a target database associated with the home insurance category. Examples of such database catalogs are depicted in FIG. 5.

FIG. 5 provides an example database catalog set 500 with a catalog A 502(A) and a catalog B 502(B). Catalog A 502(A) may be associated with a target database configured to store fields extracted from a text data segment having a car insurance category. Specifically, catalog A 502(A) includes a catalog entry 502(A1) that indicates that the target database stores data associated with a "Policy Number" data field. Catalog entry 502(A1) also indicates that the "Policy Number" data field is associated with an expected format, which includes the character "A," followed by two alphabetical characters, followed by 2 digits. Catalog entry 502 (A1) also indicates that the "Policy Number" field is associated with the following field description: "Unique identifier for the insurance policy."

Additionally, catalog A 502(A) includes a catalog entry 502(A2) that indicates that the target database stores data associated with a "Vehicle Make" data field. Catalog entry 502(A2) also indicates that the "Vehicle Make" data field is associated with an expected format, which includes a variable number of alphabetical characters. Catalog entry 502 (A2) also indicates that the "Vehicle Make" field is associated with the following field description: "Manufacturer of the vehicle."

Furthermore, catalog A 502(A) includes a catalog entry 502(A3) that indicates that the target database stores data associated with a "Vehicle Model" data field. Catalog entry 502(A3) also indicates that the "Vehicle Model" data field is associated with an expected format, which includes a variable number of alphanumeric characters. Catalog entry 502(A3) also indicates that the "Vehicle Model" field is associated with the following field description: "Model of the vehicle."

Additionally, catalog A 502(A) includes a catalog entry 502(A4) that indicates that the target database stores data associated with a "Vehicle Year" data field. Catalog entry 502(A4) also indicates that the "Vehicle Year" data field is associated with an expected format, which includes "19" or "20," followed by two digits. Catalog entry 502(A4) also indicates that the "Vehicle Year" field is associated with the following field description: "Year the vehicle was manufactured."

Moreover, catalog A 502(A) includes a catalog entry 502(A5) that indicates that the target database stores data associated with a "VIN" data field. Catalog entry 502(A5) also indicates that the "VIN" data field is associated with an expected format, which includes seventeen alphanumeric characters. Catalog entry 502(A5) also indicates that the "VIN" field is associated with the following field description: "Vehicle Identification Number."

Finally, catalog A 502(A) includes a catalog entry 502 (A6) that indicates that the target database stores data associated with a "Purchase Date" data field. Catalog entry 502(A6) also indicates that the "Purchase Date" data field is associated with an expected format, which includes four digits, followed by "\," followed by two digits, followed by "\," and followed by two digits. Catalog entry 502(A6) also indicates that the "Purchase Date" field is associated with the following field description: "Date the vehicle was manufactured."

Catalog B 502(B) may be associated with a target database configured to store fields extracted from a text data segment having a home insurance category. Specifically, catalog B 502(B) includes a catalog entry 502(B1) that indicates that the target database stores data associated with a "Policy Number" data field. Catalog entry 502(B1) also indicates that the "Policy Number" data field is associated with an expected format, which includes the character "H," followed by two alphabetical characters, followed by 2 digits. Catalog entry 502(B1) also indicates that the "Policy Number" field is associated with the following field description: "Unique identifier for the insurance policy."

Additionally, catalog B 502(B) includes a catalog entry 502(B2) that indicates that the target database stores data associated with a "Security System Installed" data field. Catalog entry 502(B2) also indicates that the "Security System Installed" data field is associated with an expected format, which includes one of "true" or "false." Catalog entry 502(B2) also indicates that the "Security System Installed" field is associated with the following field description: "Indicates if a security system is installed in the home."

Furthermore, catalog B 502(B) includes a catalog entry 502(B3) that indicates that the target database stores data associated with an "Installation Date" data field. Catalog entry 502(B3) also indicates that the "Installation Date" data field is associated with an expected format, which includes four digits, followed by "\," followed by two digits, followed by "\," and followed by two digits. Catalog entry 502(B3) also indicates that the "Installation Date" field is associated with the following field description: "Date the security system was installed."

Finally, catalog B 502(B) includes a catalog entry 502 (B4) that indicates that the target database stores data associated with an "Installation Cost" data field. Catalog entry 502(B4) also indicates that the "Installation Cost" data field is associated with an expected format, which includes a variable number of digits, followed by ".," followed by two digits. Catalog entry 502(B4) also indicates that the "Installation Cost" field is associated with the following field description: "Total cost of the security system installation."

After the prompt generation model 116 retrieves the catalog A 502(A) and the catalog B 502(B), the prompt generation model 116 may generate a first prompt based on the catalog A 502(A) and the text segment A 402(A) and a second prompt based on the catalog A 502(B) and the text segment B 402(B). Examples of such prompts are depicted in FIG. 6.

FIG. 6 provides an example prompt set 600 with a prompt A 602(A) and a prompt B 602(B). Prompt A 602(A) may be determined based on the catalog A 502(A) and the text segment A 402(A). Accordingly, prompt A 602(A) includes the field names and descriptions provided in the catalog A 602(A) as well as the text segment A 402(A). Prompt B 602(B) may be determined based on the catalog B 502(B)

and the text segment B 402(B). Accordingly, prompt B 602(B) includes the field names and descriptions provided in the catalog B 602(B) as well as the text segment B 402(B).

After the prompt generation model 116 generates prompt A 602(A) and prompt B 602(B), the generative models 130 processes prompt A 602(A) to generate a first generative model output and prompt B 602(B) to generate a second generative model output. Examples of such generative model outputs are depicted in FIG. 7.

FIG. 7 provides an example generative model output set 700 with an output A 702(A) and an output B 702(B). Output A 702(A) may be generated by processing prompt A 602(A) and includes extracted field values for data fields identified in catalog A 502(A). Accordingly, output A 702(A) includes extracted field value 702(A1) that identifies the extracted field value of "5YJ3E1EA2PF123456" for the "Policy Number" field. Additionally, output A 702(A) includes extracted field value 702(A2) that identifies the extracted field value of "Tesla" for the "Vehicle Make" field. Furthermore, output A 702(A) includes extracted field value 702(A3) that identifies the extracted field value of "Model 3" for the "Vehicle Model" field. Additionally, output A 702(A) includes extracted field value 702(A4) that identifies the extracted field value of "2023" for the "Vehicle Year" field. Moreover, output A 702(A) includes extracted field value 702(A5) that identifies the extracted field value of "5YJ3E1EA2PF123456" for the "VIN" field. Finally, output A 702(A) includes extracted field value 702(A6) that identifies the extracted field value of "2023/08/15" for the "Purchase Date"field.

Output B 702(B) may be generated by processing prompt B 602(B) and includes extracted field values for data fields identified in catalog B 502(B). Accordingly, output B 702(B) includes extracted field value 702(B1) that identifies the extracted field value of "HBC12" for the "Policy Number" field. Additionally, output B 702(B) includes extracted field value 702(B2) that identifies the extracted field value of "True" for the "Security System Installed" field. Furthermore, output B 702(B) includes extracted field value 702 (B3) that identifies the extracted field value of "2023/10/01" for the "Installation Date" field. Finally, output B 702(B) includes extracted field value 702(B4) that identifies the extracted field value of "1500.00" for the "Installation Cost" field.

After the generative models 130 process prompt A 602(A) to generate output A 702(A) and prompt B 602(B) to generate output B 702(B), the validation model 134 routes the extracted field values identified by those outputs to one of the target databases 122 or the reviewer platform 146 based on whether the extracted field values identified by output A 702(A) and by output B 702(B) satisfy the format requirements identified by catalog A 502(A) and catalog B 502(B), respectively. An operational example of such conditional routing is provided in FIG. 8.

Figure 8:
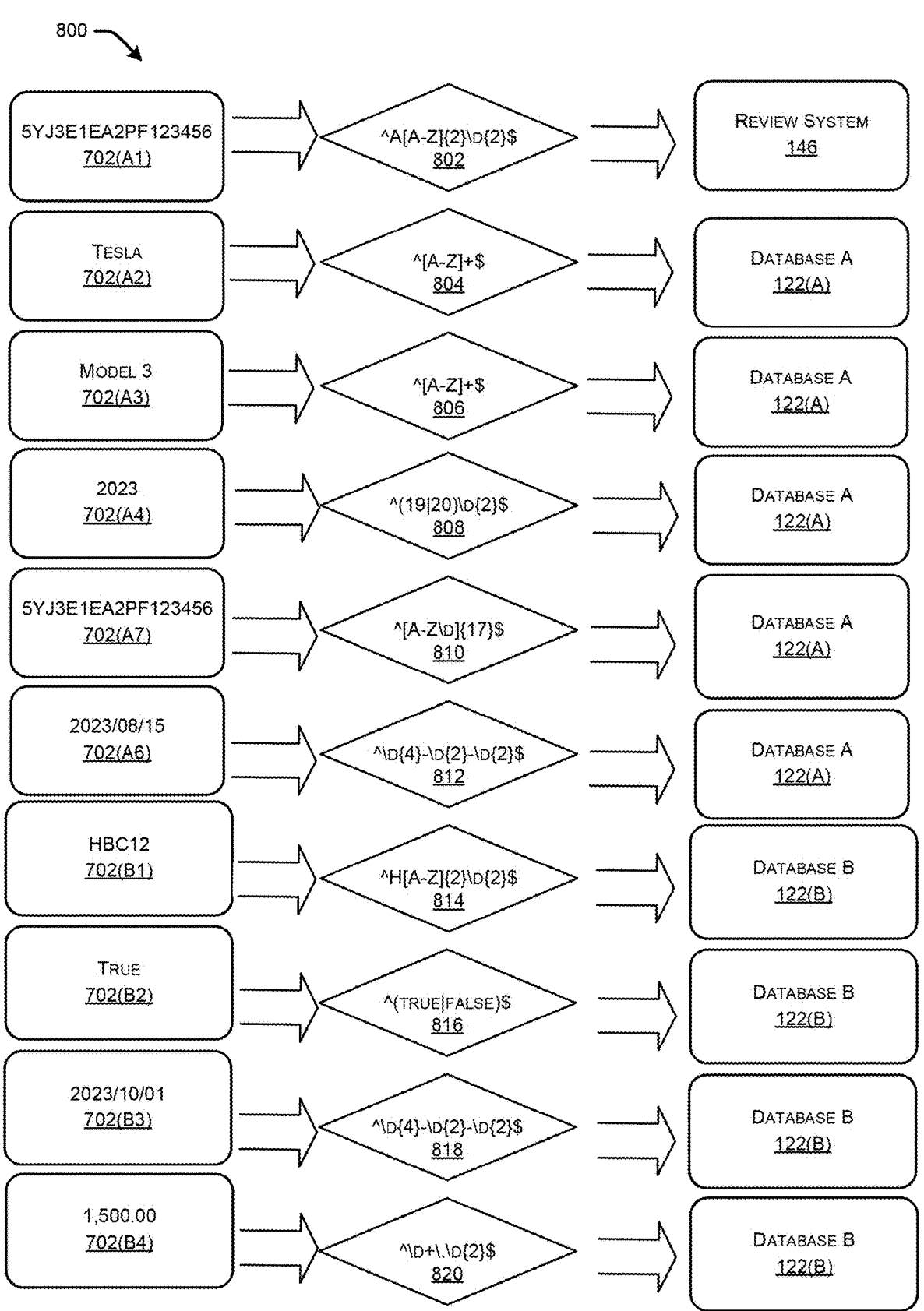
FIG. 8 provides an operational example of performing conditional validation and routing operations on a set of extracted field values.

FIG. 8 provides an example set of conditional routing operations 800 based on data formatting requirements. As depicted in FIG. 8, the set of conditional routing operations 800 includes routing the extracted field value 702(A1) to the reviewer platform 146 based on determining that extracted field value 702(A1) fails to satisfy the formatting requirement 802, as identified by the catalog entry 502(A1). The set of conditional routing operations 800 further includes routing the extracted field value 702(A2) to the database A 122(A) based on determining that extracted field value 702(A2) satisfies the formatting requirement 804, as identified by the catalog entry 502(A2). The set of conditional routing operations 800 further includes routing the extracted field value 702(A3) to the database A 122(A) based on determining that extracted field value 702(A3) satisfies the formatting requirement 806, as identified by the catalog entry 502(A3). The set of conditional routing operations 800 further includes routing the extracted field value 702(A4) to the database A 122(A) based on determining that extracted field value 702(A4) satisfies the formatting requirement 808, as identified by the catalog entry 502(A4). The set of conditional routing operations 800 further includes routing the extracted field value 702(A5) to the database A 122(A) based on determining that extracted field value 702(A5) satisfies the formatting requirement 810, as identified by the catalog entry 502(A5). The set of conditional routing operations 800 further includes routing the extracted field value 702(A6) to the database A 122(A) based on determining that extracted field value 702(A6) satisfies the formatting requirement 812, as identified by the catalog entry 502(A6).

Additionally, the set of conditional routing operations 800 include routing the extracted field value 702(B1) to the database B 122(B) based on determining that extracted field value 702(B1) fails to satisfy the formatting requirement 814, as identified by the catalog entry 502(B1). The set of conditional routing operations 800 include routing the extracted field value 702(B2) to the database B 122(B) based on determining that extracted field value 702(B2) fails to satisfy the formatting requirement 816, as identified by the catalog entry 502(B2). The set of conditional routing operations 800 include routing the extracted field value 702(B3) to the database B 122(B) based on determining that extracted field value 702(B3) fails to satisfy the formatting requirement 818, as identified by the catalog entry 502(B3). The set of conditional routing operations 800 include routing the extracted field value 702(B4) to the database B 122(B) based on determining that extracted field value 702(B4) fails to satisfy the formatting requirement 820, as identified by the catalog entry 502(B4).

As the operational example provided in FIGS. 4-8 depict, a prompt associated with a text segment may be determined based on the database catalog associated with the segment's category. Moreover, the field values identified by processing the prompt may be validated and/or routed based on data field formatting requirements specified by that database catalog. Collectively, these techniques enable the data processing system 102 to: (i) conditionally validate extracted data values based on segment categories associated with the text segments from which the values are extracted, and/or (ii) conditionally route extracted data values to one of a target database or a reviewer platform based on conditional validation results.

Figure 9:
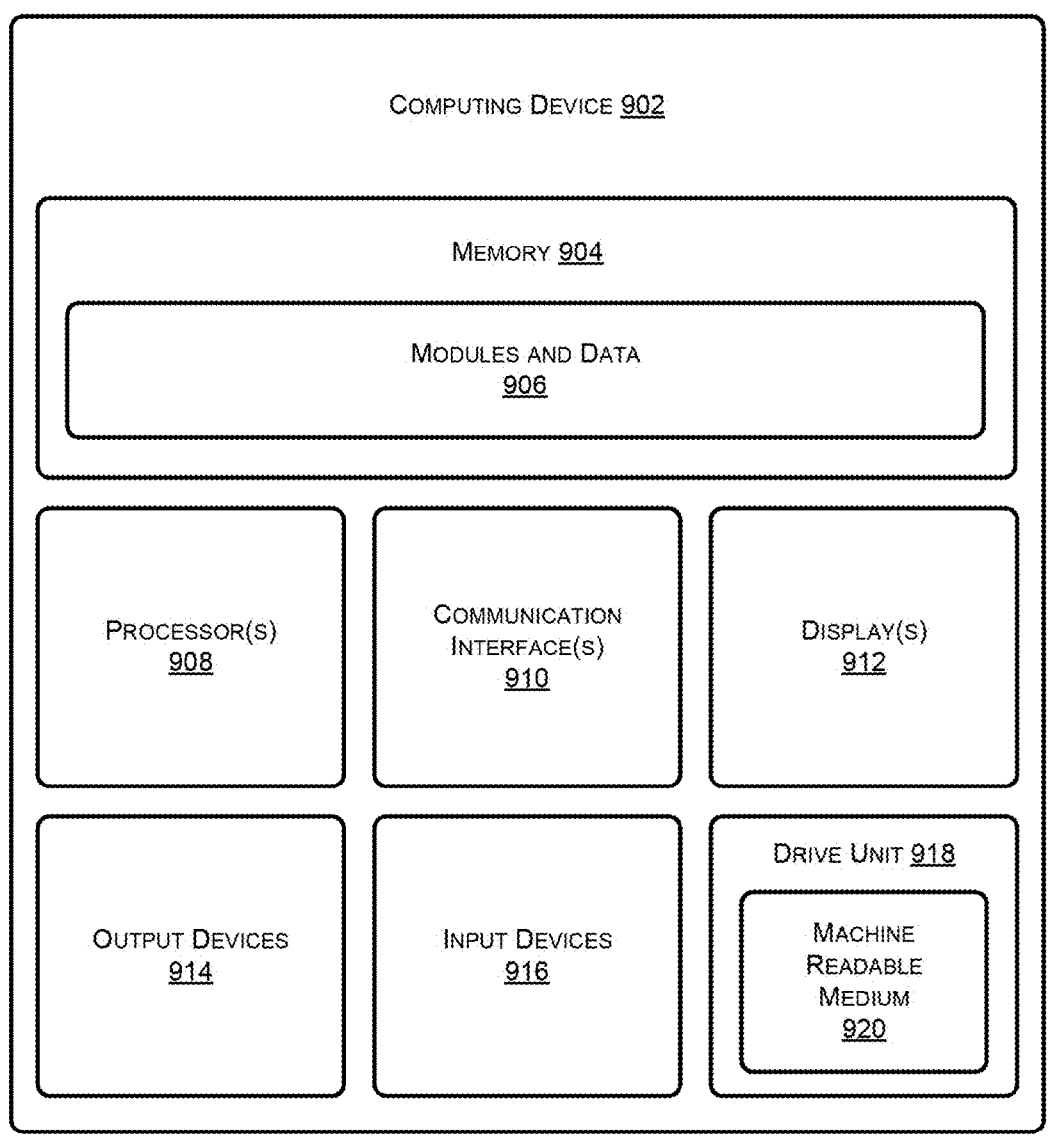
FIG. 9 shows an example system architecture for a computing device associated with an environment for automated data extraction, validation, and routing from unstructured text data.

FIG. 9 shows an example system architecture for a computing device 902 associated with the environment 100 described herein. A computing device 902 can be a server, computer, or other type of computing device that executes at least a portion of the environment 100. In some examples, elements of the environment 100 can be distributed among, and/or be executed by, multiple computing devices 902.

A computing device 902 can include memory 904. In various examples, the memory 904 can include system memory, which may be volatile (such as RAM), nonvolatile (such as ROM, flash memory, etc.) or some combination of the two. The memory 904 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 902 associated with the environment 100. Any such non-transitory computer-readable media may be part of the computing devices 902. The memory 904 can include modules and data 906 needed to perform operations of one or more computing devices 902 of the environment 100.

One or more computing devices 902 of the environment 100 can also have processor(s) 908, communication interfaces 910, displays 912, output devices 914, input devices 916, and/or a drive unit 918 including a machine readable medium 920.

In various examples, the processor(s) 908 can be a central processing unit (CPU), a graphics processing unit (GPU), both a CPU and a GPU, or any other type of processing unit. Each of the one or more processor(s) 908 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 908 may also be responsible for executing computer applications stored in the memory 904, which can be associated with common types of volatile (RAM) and/or nonvolatile (ROM) memory.

The communication interfaces 910 can include transceivers, modems, interfaces, antennas, telephone connections, and/or other components that can transmit and/or receive data over networks, telephone lines, or other connections.

The display 912 can be a liquid crystal display or any other type of display commonly used in computing devices. For example, a display 912 may be a touch-sensitive display screen and can then also act as an input device or keypad, such as for providing a soft-key keyboard, navigation buttons, or any other type of input.

The output devices 914 can include any sort of output devices known in the art, such as a display 912, speakers, a vibrating mechanism, and/or a tactile feedback mechanism. Output devices 914 can also include ports for one or more peripheral devices, such as headphones, peripheral speakers, and/or a peripheral display.

The input devices 916 can include any sort of input devices known in the art. For example, input devices 916 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 920 can store one or more sets of instructions (e.g., a set of computer-executable instructions), such as software or firmware that embodies any one or more of the methodologies or functions described herein. The instructions can also reside, completely or at least partially, within the memory 904, processor(s) 908, and/or communication interface(s) 910 during execution thereof by the one or more computing devices 902 of the environment 100. The memory 904 and the processor(s) 908 also can constitute machine readable media 920. The instructions may cause the processor(s) 908 to perform operations described in this document.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:

receiving, by a processor, an electronic file including text indicative of a customer interaction;

determining, by the processor, a first category associated with a first portion of the text and a second category associated with a second portion of the text;

selecting, by the processor, a first database corresponding to the first category, the first database being associated with a schema, the schema identifying a first field name of a first data field, a first data format corresponding to the first data field, and a first description of the first data field;

providing, by the processor, the first portion of the text and the first description as a first prompt to a trained machine learning model, the machine learning model generating, based on the first prompt, an output identifying a first value corresponding to the first description and associating the first value with a second field name, the first prompt requesting extraction of the first value corresponding to the first description, wherein:

providing the first prompt to the machine learning model is by a first processing thread, the first processing thread is executed in parallel with a second processing thread, and the second processing thread is configured to provide a second prompt corresponding to the second portion to the machine learning model;

determining, by the processor, that the first value satisfies a first constraint, the first constraint requiring at least one of:

that the second field name of the first value matches the first field name represented by the schema, or that a second data format of the first value matches the first data format represented by the schema;

based on determining that the first value satisfies the first constraint, generating, by the processor, first metadata corresponding to the electronic file, the first metadata representing the first value for the first data field; and storing, by the processor, the first metadata in the first database and in association with the electronic file.

2. The method of claim 1, further comprising:

selecting, by the processor, a second database corresponding to the second category, the second database identifying a second field name for a second data field, a second data format corresponding to the second data field, and a second description of the second data field;

providing, by the processor, the second portion of the text and the second description as inputs to the trained machine learning model, the machine learning model determining, based on the inputs, a second value corresponding to the second data field;

determining, by the processor, that the second value fails to satisfy a second constraint associated with at least one of the second field name or the second data format;

based on determining that the second value fails to satisfy the second constraint, generating, by the processor, second metadata for the electronic file, the second metadata representing the second value for the second data field; and providing, by the processor, the second metadata to a user.

3. The method of claim 1, wherein determining the first category comprises:

providing, by the processor, the first portion as input to a second trained machine learning model; and receiving, by the processor, the first category as output of the second trained machine learning model.

4. The method of claim 3, wherein the trained machine learning model is a generative machine learning model and the second trained machine learning model is a classifier machine learning model.

5. The method of claim 1, wherein validating the first value comprises:

determining, by the processor, a range of valid values for the first data field based on the first data format; and determining, by the processor, that the first value is in the range.

6. The method of claim 1, further comprising generating a summary based on the electronic file, wherein the summary identifies the first value.

7. The method of claim 1, further comprising:

determining an intent of the customer interaction based on the first portion; and determining the first category based on the intent.

8. The method of claim 1, wherein receiving the electronic file comprises:

receiving, by the processor, an audiovisual recording of the customer interaction; and generating, by the processor, a transcript of the audiovisual recording, wherein the electronic file comprises the transcript.

9. A computing system, comprising:

a processor; and memory storing computer-executable instructions that, when executed by the processor, cause the computing system to perform operations comprising:

receiving an electronic file including text indicative of a customer interaction;

determining a first category associated with a first portion of the text and a second category associated with a second portion of the text;

selecting a first database corresponding to the first category, the first database being associated with a schema, the schema identifying a first field name of a first data field, a first data format corresponding to the first data field, and a first description of the first data field;

providing the first portion of the text and the first description as a first prompt to a trained machine learning model, the machine learning model generating, based on the first prompt, an output identifying a first value corresponding to the first description and associating the first value with a second field name, the first prompt requesting extraction of the first value corresponding to the first description, wherein:

providing the first prompt to the machine learning model is by a first processing thread, the first processing thread is executed in parallel with a second processing thread, and the second processing thread is configured to provide a second prompt corresponding to the second portion to the machine learning model;

determining that the first value satisfies a first constraint, the first data forma, the first constraint requiring at least one of:

that the second field name of the first value matches the first field name represented by the schema, or that a second data format of the first value matches the first data format represented by the schema;

based on determining that the first value satisfies the first constraint, generating first metadata for the electronic file, the first metadata representing the first value for the first data field; and storing the first metadata in the first database and in association with the electronic file.

10. The computing system of claim 9, the operations further comprising:

selecting a second database corresponding to the second category, the second database identifying a second field name for a second data field, a second data format corresponding to the second data field, and a second description of the second data field;

providing the second portion of the text and the second description as inputs to the trained machine learning model, the machine learning model determining, based on the inputs, a second value corresponding to the second data field;

determining that the second value fails to satisfy a second constraint associated with at least one of the second field name or the second data format;

based on determining that the second value fails to satisfy the second constraint, generating second metadata for the electronic file, the second metadata representing the second value for the second data field; and providing the second metadata to a user.

11. The computing system of claim 9, wherein determining the first category comprises:

providing, by the processor, the first portion as input to a second trained machine learning model; and receiving, by the processor, the first category as output of the second trained machine learning model.

12. The computing system of claim 11, wherein the trained machine learning model is a generative machine learning model and the second trained machine learning model is a classifier machine learning model.

13. The computing system of claim 9, wherein validating the first value comprises:

determining, by the processor, a range of valid values for the first data field based on the first data format; and determining, by the processor, that the first value is in the range.

14. The computing system of claim 9, wherein validating the first value comprises:

determining, by the processor, a range of valid values for the first data field based on the first data format; and determining, by the processor, that the first value is in the range.

15. The computing system of claim 9, further comprising generating a summary based on the electronic file, wherein the summary identifies the first value.

16. One or more non-transitory computer-readable media storing computer-executable instructions that, when executed by a processor, cause the processor to perform operations, comprising:

receiving an electronic file including text indicative of a customer interaction;

determining a first category associated with a first portion of the text and a second category associated with a second portion of the text;

selecting a first database corresponding to the first category, the first database being associated with a schema, the schema identifying a first field name of a first data field, a first data format corresponding to the first data field, and a first description of the first data field;

providing the first portion of the text and the first description as a first prompt to a trained machine learning model, the machine learning model generating, based on the first prompt, an output identifying a first value corresponding to the first description and associating the first value with a second field name, the first prompt requesting extraction of the first value corresponding to the first description, wherein:

providing the first prompt to the machine learning model is by a first processing thread, the first processing thread is executed in parallel with a second processing thread, and the second processing thread is configured to provide a second prompt corresponding to the second portion to the machine learning model;

determining that the first value satisfies a first constraint, the first constraint requiring at least one of:

that the second field name of the first value matches the first field name represented by the schema, or that a second data format of the first value matches the first data format represented by the schema;

based on determining that the first value satisfies the first constraint, generating first metadata for the electronic file, the first metadata representing the first value for the first data field; and storing the first metadata in the first database and in association with the electronic file.

17. The one or more non-transitory computer-readable media of claim 16, the operations further comprising:

selecting a second database corresponding to the second category, the second database identifying a second field name for a second data field, a second data format corresponding to the second data field, and a second description of the second data field;

providing the second portion of the text and the second description as inputs to the trained machine learning model, the machine learning model determining, based on the inputs, a second value corresponding to the second data field;

determining that the second value fails to satisfy a second constraint associated with at least one of the second field name or the second data format;

based on determining that the second value fails to satisfy the second constraint, generating second metadata for the electronic file, the second metadata representing the second value for the second data field; and providing the second metadata to a user.

18. The one or more non-transitory computer-readable media of claim 16, wherein determining the first category comprises:

providing, by the processor, the first portion as input to a second trained machine learning model; and receiving, by the processor, the first category as output of the second trained machine learning model.

19. The one or more non-transitory computer-readable media of claim 18, wherein the trained machine learning model is a generative machine learning model and the second trained machine learning model is a classifier machine learning model.

20. The one or more non-transitory computer-readable media of claim 16, wherein validating the first value comprises:

determining, by the processor, a range of valid values for the first data field based on the first data format; and determining, by the processor, that the first value is in the range.

\* \* \* \* \*